United States Patent [19]

Kohr

[11] Patent Number: 5,364,453
[45] Date of Patent: Nov. 15, 1994

[54] METHOD FOR RECOVERING GOLD AND OTHER PRECIOUS METALS FROM CARBONACEOUS ORES

[75] Inventor: William J. Kohr, San Mateo, Calif.

[73] Assignee: Geobiotics, Inc., Hayward, Calif.

[21] Appl. No.: 57,300

[22] Filed: May 3, 1993

Related U.S. Application Data

[63] Continuation-in-part of Ser. No. 950,576, Sep. 22, 1992.

[51] Int. Cl.⁵ .................. C01G 7/00; C22B 11/04
[52] U.S. Cl. ............................ 75/711; 75/736; 423/27
[58] Field of Search ............... 75/711, 736; 423/27

[56] References Cited

U.S. PATENT DOCUMENTS

| | | | |
|---|---|---|---|
| 2,838,369 | 6/1958 | Gaudin et al. | 23/14.5 |
| 2,890,795 | 6/1959 | Dering | 209/12 |
| 3,450,523 | 1/1969 | Socolescu | 75/7 |
| 3,574,600 | 4/1971 | Scheiner et al. | 75/105 |
| 3,635,697 | 1/1972 | Scheiner et al. | 75/101 |
| 3,639,925 | 2/1972 | Scheiner et al. | 75/101 |
| 3,703,366 | 11/1972 | Cullom | 75/74 |
| 3,764,650 | 10/1973 | Scheiner et al. | 423/38 |
| 3,979,205 | 9/1976 | Wanzenberg | 75/10 |
| 4,188,208 | 2/1980 | Guay | 75/105 |
| 4,289,532 | 9/1981 | Matson et al. | 75/105 |
| 4,347,126 | 8/1982 | McGarry et al. | 209/164 |
| 4,552,589 | 11/1985 | Mason et al. | 75/105 |
| 4,578,163 | 3/1986 | Kunter et al. | 204/110 |
| 4,585,550 | 4/1986 | Avotins et al. | 209/166 |
| 4,610,724 | 9/1986 | Weir et al. | 75/118 |
| 4,702,824 | 10/1987 | Abadi | 209/167 |
| 4,786,323 | 11/1988 | Gock et al. | 75/118 |
| 4,814,007 | 3/1989 | Lin et al. | 75/118 |
| 4,895,597 | 1/1990 | Lin et al. | 75/118 |
| 4,900,431 | 2/1990 | Cariou et al. | 209/164 |
| 4,902,345 | 2/1990 | Ball et al. | 75/118 |
| 4,923,510 | 5/1990 | Ramadorai et al. | 423/29 |
| 4,950,390 | 8/1990 | Szentlaszloi et al. | 209/164 |
| 5,013,359 | 5/1991 | Fair et al. | 75/744 |
| 5,021,088 | 6/1991 | Portier | 75/736 |
| 5,051,199 | 9/1991 | Barwise | 252/61 |
| 5,073,354 | 12/1991 | Fuller et al. | 423/24 |
| 5,074,909 | 12/1991 | Agar | 75/422 |
| 5,147,618 | 9/1992 | Touro | 423/27 |

FOREIGN PATENT DOCUMENTS

| | | |
|---|---|---|
| 1062918 | 9/1979 | Canada . |
| 0229224 | 9/1986 | European Pat. Off. . |
| 1105237 | 1/1983 | U.S.S.R. |
| 2136015 | 9/1984 | United Kingdom . |

OTHER PUBLICATIONS

Scheiner, B. J., et al., *Processing Refractory Carbonaceous Ores for Gold Recovery*, Journal of Metals, pp. 37–40, Mar. 1971.

Guay, W. J., *The Treatment of Refractory Gold Ores Containing Carbonaceous Material and Sulfides*, Society of Mining Engineers of AIME, Reprint No. 81–45, pp. 1–4.

Hutchins, S. R., et al., *Microbial Pretreatment of Refractory Sulfide and Carbonaceous Ores Improves the Economics of Gold Recovery*, Mining Engineering, pp. 249–254 (Apr. 1988).

Scheiner, B. J., et al., *Oxidation Process for Improving Gold Recovery from Carbon–Bearing Gold Ores*, U.S. Dept. of the Interior, Report of Investigations 7573.

Han, K., et al. *Separation of Carbonaceous Material from*

(List continued on next page.)

*Primary Examiner*—Peter D. Rosenberg
*Attorney, Agent, or Firm*—Lyon & Lyon

[57] ABSTRACT

A method for recovering precious metals from carbonaceous ore comprising leaching the ore with a lixiviant solution and then preg-robbingly concentrating the precious metal-lixiviant complexes in solution on to the native carbonaceous component of the ore for subsequent recovery. The preg-robbing capacity of the native carbonaceous component of the ore can be augmented by adding recycled carbonaceous matter or finely ground carbon to the ore-lixiviant mixture. Furthermore, after the carbonaceous component of the ore is separated from the gangue, the gangue material can be treated in a hot CIL process to further increase the recovery of the precious metal.

17 Claims, 9 Drawing Sheets

OTHER PUBLICATIONS

*Carlin Ore by Flotation*, Advances in Gold and Silver Processing, Conference Proceedings, Reno, Nev., Chapter 13, pp. 121–130.

Afenya, P. M., *Treatment of Carbonaceous Refractory Gold Ores*, Mineral Engineering, vol. 4, pp. 1043–1055 (1991).

Radtke, A., *Studies of Hydrothermal Gold Deposition (I). Carlin Gold Deposit, Nevada: The Role of Carbonaceous Materials in Gold Deposition*, Economic Geology and the Bulletin of the Society of Economic Geologists, pp. 87–102, vol. 65, Mar.–Apr. 1970 No. 2.

Scheiner, B. J., *Relation of Mineralogy to Treatment Methods for Carbonaceous Gold Ores*, Society of Mining Engineers, pp. 1–6, Preprint No. 87–96.

Johns, M. W., et al., *Recovery of Gold From Ashed Woodchips*, J. S. Afr. Inst. Min. Metall., vol. 90, No. 1, pp. 1–10 (Jan. 1990).

Han, K. N., et al., *Using Flotation to Separate Carbon Material From Carlin Ore*, Mining Engineering, vol. 42, No. 12, p. 1328 (Dec. 1990).

Lichy, L., et al., *Treatment Refractory Ores: A Simplified Process*, Mining Engineering, vol. 42, No. 12, p. 1328 (Dec. 1990).

Crabtree, E. H., Jr., et al., *Developments in the Application of Activated Carbon to Cyanidation (Including the Desorption of Gold and Silver from Carbons)*, Mining Eng., Transactions AIME, vol. 1987, pp. 217–222 (Feb. 1950).

Rosenbaum, J. M., et al., *Benefication of Fine Western Coal by Froth Flotation*, The American Institute of Chemical Engineers pp. 19–28 (1982).

Scheiner, B. J., *Carbonaceous Gold Ores*, Inf. Circ., U.S. Bureau of Mines, pp. 26–33 (1986).

Williams, M. C., et al., *A Simple Flotation Method for Rapidly Assessing the Hydrophobicity of Coal Particles*, International Journal of Mineral Processing, 20 (1987) pp. 153–157.

Ibrado, A. S., et al., *Effect of the Structure of Carbon Adsorbents on the Adsorption of Gold Cyanide*, Hydrometallurgy, 30 (1992) 243–256, Elsevier Science Publishers B.V., Amsterdam.

Fuerstenau, D. W., *Characterization of Coal Particle Surfaces by Film Flotation*, Proceedings of Surface Chemistry of Coal, Los Angeles, Calif., Sep. 25–30, 1988, pp. 748–755.

Orlich, J. N., *Column Flotation of Carbon at the Royal Mt. King Mine*, SME Annual Meeting—Phoenix, Ariz., Feb. 24–27, 1992.

Fuersteanau, et al., *Coal Surface Control for Advanced Fine Coal Flotation*, Project No. DE-AC2-2-88PC88878, Quarterly Report No. 11, Apr. 1 through Jun. 30, 1991.

McDougall, G. J., et al., *Gold Complexes and Activated Carbon*, Gold Bulletin, 1981 14.4, pp. 138–142.

Collins, D. J., *Optimum Charcoal Loading Calculations and Other Developments to a CIP Circuit*, Society of Mining Engineers, (1989) Preprint No. 89–133, pp. 1–5.

King, J. A., *Gold Isotherms*, Proceedings of the International Symposium on Gold Metallurgy, Winnipeg, Canada, Aug. 23, 1987, pp. 59–75.

Goode, J. R., *Refractory Gold Ore: Causes, Processes, Testing and Plants*, Society for Mining, Metallurgy, and Exploration, Inc., Reprint No. 93–82 (1993), p. 4.

Hall, K. B., *Homestake Uses Carbon-In-Pulp*, World Mining, Nov. 1984, pp. 44–49.

St. Louis, R. M., et al., *Recovery Enhancement in the Mercur Autoclave Circuit*, Gold '90, Chapter 42, pp. 443–450.

Thomas, K. G., *The Practice of C.I.P. and C.I.L.*, for presentation at the McGill University Short Course, Montreal, Quebec, Canada, May 3, 1985, pp. 1–18.

Heinen, H. J., *Malononitrile Extraction of Gold From Ores*, Report of Investigations 7464, U.S. Dept. of the Interior, Bureau of Mines, Report of Investigations 7464, 1971, pp. 1–11.

*TIME REFERS TO TIME IN CYANIDE BEFORE THE FLOTATION

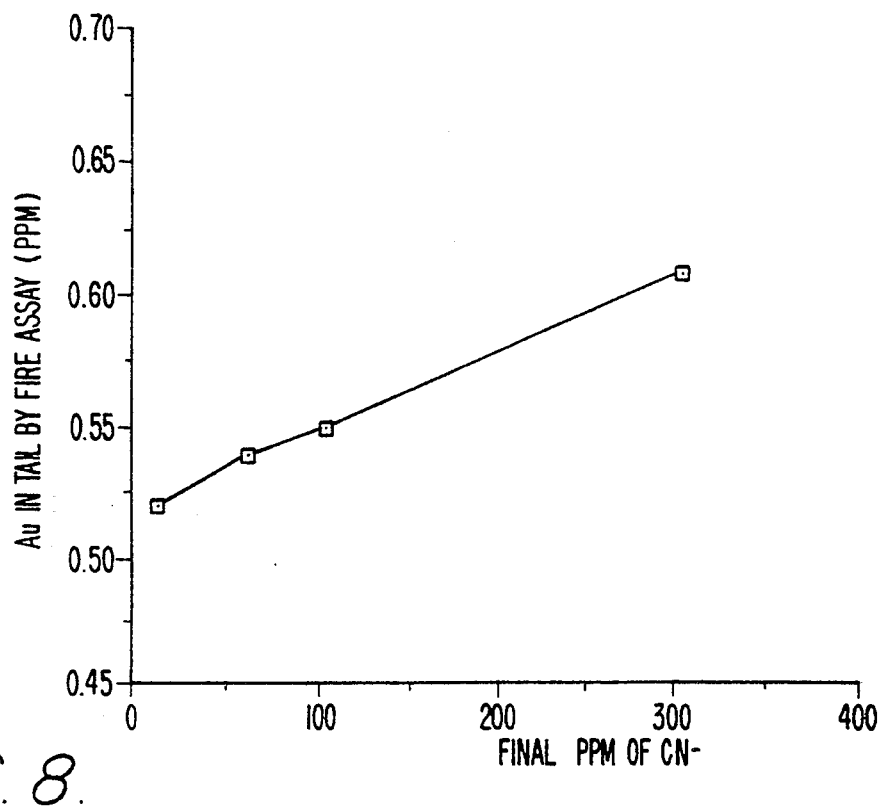
FIG. 8.
FIG. 9.
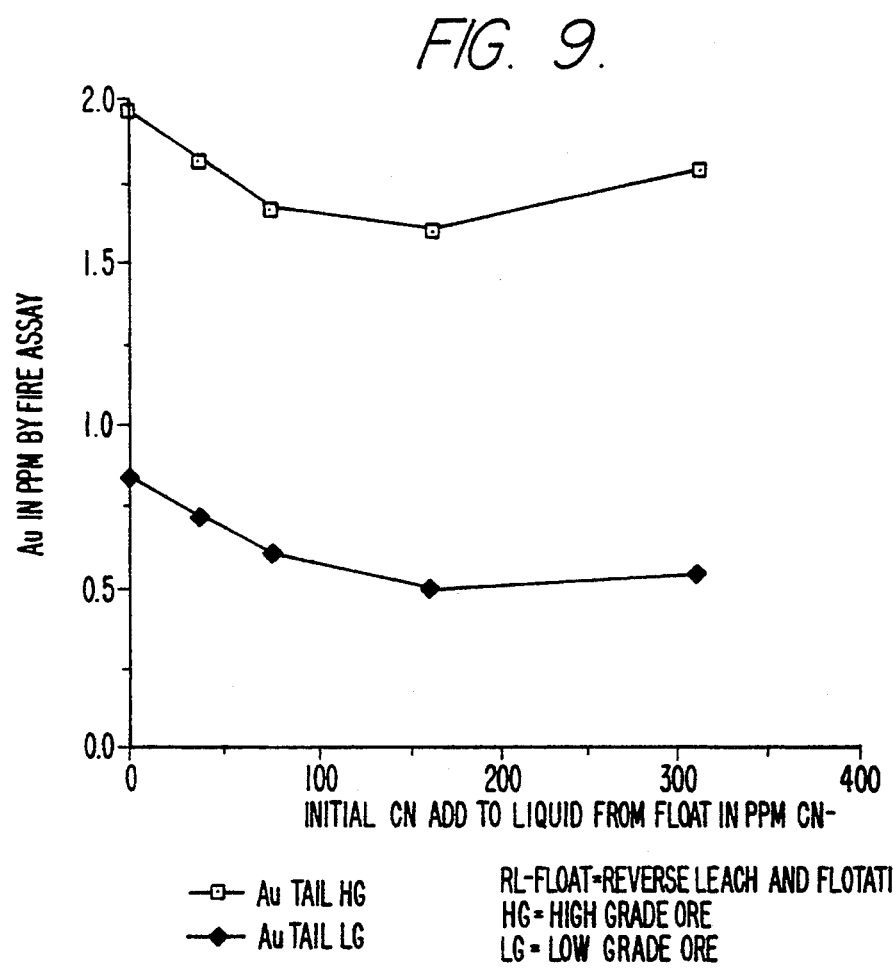
—□— Au TAIL HG
—♦— Au TAIL LG
RL-FLOAT=REVERSE LEACH AND FLOTATION PROCESS
HG = HIGH GRADE ORE
LG = LOW GRADE ORE

METHOD FOR RECOVERING GOLD AND OTHER PRECIOUS METALS FROM CARBONACEOUS ORES

This application is a continuation-in-part of the application Ser. No. 07/950,576, filed Sep. 22, 1992.

BACKGROUND OF THE INVENTION

1. Field of the Invention

The present invention relates to the recovery of precious metals from carbonaceous ores. More particularly, the invention concerns improved leaching techniques for these ores.

2. Description of the Prior Art

Gold is one of the rarest metals on earth. Gold ores can be categorized into two types: free milling and refractory. Free milling ores are those that can be processed by simple gravity techniques or direct cyanidation. Refractory ores, on the other hand, are difficult to process. Refractory ore resources can consist of ores, flotation concentrates, mill tailings, and other reserves. In the past, refractory ores have required pre-cyanidation treatments to liberate the gold. The difficulty of processing refractory gold ores is attributable to their mineralogy.

A large number of refractory ores consist of ores with a precious metal such as gold occluded in iron sulfide particles. The iron sulfide particles consist principally of pyrite and arsenopyrite. If the gold remains occluded, even after fine milling of these ores, then the sulfides must be oxidized to liberate the encapsulated precious metal and make it amenable to a leaching agent (or lixiviant).

Carbonaceous gold ores represent a unique class of refractory ores. Not only is gold sometimes found encapsulated in sulfide minerals in these ores, but these ores also contain carbonaceous matter that interferes with recovery by cyanidation. Gold in carbonaceous ores, therefore, can be associated with sulfide minerals, carbonaceous matter, and/or siliceous minerals. P. Afenya, *Treatment of Carbonaceous Refractory Gold Ores*, Minerals Engineering, Vol. 4, Nos 7-11, pp 1043-55, 1991, hereby incorporated by reference. The distribution of gold in these mineral groups can vary considerably from ore to ore.

Researchers have identified the carbonaceous matter in these ores as containing (1) an activated carbon component capable of adsorbing gold-chloride complexes and gold-cyanide complexes from solution, (2) a mixture of high molecular weight hydrocarbons usually associated with the activated carbon components; and (3) an organic acid, similar to humic acid containing functional groups capable of interacting with gold complexes to form organic gold compounds. P. Afenya, *Treatment of Carbonaceous Refractory Gold Ores*, Minerals Engineering, Vol. 4, pp. 1043-1055, 1991, hereby incorporated by reference; W. Guay, *The Treatment of Refractory Gold Ores Containing Carbonaceous Material and Sulfides*, Society of Mining Engineers of AIME, 81-34, pp. 1-4, 1981, hereby incorporated by reference.

Carbonaceous matter, can therefore directly or indirectly interfere with lixiviation. Direct interference with lixiviation is ascribed to either occlusion of the gold within the carbonaceous material or formation of a stable gold-carbon complex similar to a chelate. The more common problem with these ores, however, is indirect interference. This occurs when the gold-lixiviant complex formed during lixiviation is sorbed by the native carbonaceous material and, therefore, is no longer available for recovery from solution. This phenomenon is called preg-robbing.

Preg-robbing is frequently associated with the use of cyanide as the lixiviant. However, it also occurs with gold-lixiviant complexes other than aurocyanide.

Certain clay materials such as illite, kaolin, and montmorillonite are also known to preg-robbingly adsorb the gold-cyanide complex. Thus, the degree of preg-robbing exhibited by an ore depends on the amount of carbonaceous matter and preg-robbing clay materials in the ore. As used herein, it should be understood that carbonaceous component and carbonaceous matter also refer to preg-robbing clays, because the preg-robbing properties of these materials are functionally similar to that of the actual carbonaceous matter in the ore.

While preg-robbing is most frequently associated with cyanidation processes, the preg-robbing phenomenon is also known to occur with other gold-lixiviant complexes such as gold-chloride. The inventor has even experienced preg-robbing of gold-thiourea complexes while using a thiourea lixiviant.

Carbonaceous ores vary significantly from deposit to deposit, and even within deposits, in the amount of carbonaceous matter they contain. These ores have been reported to contain from approximately 0.2% carbon to as much as 5% carbon. P. Afenya, *Treatment of Carbonaceous Refractory Gold Ores*, Minerals Engineering, Vol. 4, pp. 1043-1055, 1991.

If P represents the preg-robbing component of the ore, V represents a valuable mineral component (i.e., gold, silver, or platinum), and G represents the gangue materials in the ore, then preg-robbing may be illustrated by the following general formula:

$$P(V_1) + G(V_2) \xrightarrow{\text{lixiviant}} P(V_1 + V_x) +$$

$$G(V_{2-(x+y)}) + \text{lixiviant}(V_y)$$

Wherein $V_1$ represents the precious metal closely associated with the preg-robbing material in the ores, $V_2$ represents the precious metal associated with gangue material, $V_x$ represents the precious metal preg-robbingly removed from the lixiviant solution, $V_y$ represents the precious metal-lixiviant complexes remaining in solution, and $V_{2-(x+y)}$ represents the amount of precious metal remaining associated with the gangue material after lixiviation.

Thus, the amount of precious metal that is associated with the preg-robbing component of the ore after lixiviation is equal to the amount of precious metal originally associated with the preg-robbing component of the ore plus the amount that is preg-robbingly removed from the lixiviant solution ($V_x$). The amount of precious metal remaining associated with the gangue material ($V_{2-(x+y)}$) is equal to the original amount of precious metal ($V_2$) minus the amount of precious metal dissolved by the lixiviant ($V_x + V_y$).

A number of techniques have been developed for processing refractory carbonaceous gold ores. These techniques include flotation, blanking, carbon in leach, roasting, chemical oxidation, and bacterial leaching. Roasting and oxidation by chlorination are the two methods that are most developed and applicable for treating carbon-bearing ores. The others may play some role in the future or are often confused with methods for processing carbonaceous ores, even within the mining industry, when they are really more suited to treating refractory sulfidic ores. The various techniques are described below:

1. Flotation and Depression

This method has been employed successfully where small amounts of gold are associated with the carbonaceous matter in the ore. In such circumstances, the carbonaceous matter can be floated off and discarded. The remaining ore is then processed using conventional cyanidation techniques. This technique, however, does not work for ores in which considerable quantities of gold are associated with the carbonaceous component. J. Orlich, J. Fuestenau, & D. Horne, Column Flotation of Carbon at the Royal Mt. King Mine, SME Annual Meeting, Phoenix, Ariz., February 1992.

One mining operation has tried to produce a high grade concentrate for possible shipment to a smelter and a tailing which could be discarded or directly cyanided. W. Guay, *The Treatment of Refractory Gold Ores Containing Carbonaceous Material and Sulfides*, Society of Mining Engineers of AIME, 81–34, pp. 1–4, 1981. The concentrates contained both carbonaceous materials and pyrite, but exhibited low recoveries of gold.

According to the process disclosed in U.S. Pat. No. 4,585,550, hereby incorporated by reference, a coal fraction containing economically significant concentrations of a desirous mineral value can be recovered from a carbonaceous ore by flotation. However, under this process, gold values contained in the non-floated fractions of the ore are lost; thus, this process can only be used if small amounts of gold are associated with the unrecovered fractions.

Other goldfields have depressed the carbonaceous component of the ore while floating the sulphide minerals and free gold. P. Afenya, *Treatment of Carbonaceous Refractory Gold Ores*, Minerals Engineering, Vol. 4, pp. 1043–1055, 1991. Again, however, this technique would not be used if the carbonaceous component contained significant quantities of gold.

A common problem with all of the flotation processes, therefore, is that the gold associated with the ore fraction that is to be discarded is lost because it is generally uneconomical to recover. As a result, the tail fraction must contain very small amounts of gold for the existing flotation processes to work satisfactorily. However, the mineralogy of a carbonaceous gold ore deposit is continually changing. Therefore, as the amount of gold associated with the ore fraction that is to be discarded (i.e., the tail) increases, the amount of gold values lost during flotation also increases. Current flotation processes are not flexible enough to compensate for these changes in the mineralogies of carbonaceous gold ores. The present invention overcomes this problem by preg-robbingly concentrating the gold values in the carbonaceous component of the ore prior to flotation.

2. Blanking

Blanking agents are used to passivate the surfaces of activated carbon in carbonaceous ores. The blanking agents work by selectively adsorbing on the surface of the activated carbon preferentially to the gold-lixiviant complexes in solution. Kerosene, fuel oil, and RV-2 (para nitro benzol azo salicylic acid) have been used as blanking agents. This method is not applicable where considerable quantities of gold are associated with the carbonaceous matter. And as explained in U.S. Pat. No. 3,574,600, blanking is also not applicable to ores that contain significant quantities of organic acids as carbonaceous matter. One of the objects of the present invention is to permit the processing of carbonaceous ores regardless of native carbon content and regardless of the amount of gold originally associated with the carbonaceous matter.

3. Activated Carbon or Resin In Leach or Pulp

Activated carbon or resin can be added to leach solutions to preferentially adsorb aurocyanide. This process rests on the principle of using a stronger aurocyanide adsorbent than the carbonaceous matter in the ore. P. Afenya, *Treatment of Carbonaceous Refractory Gold Ores*, Minerals Engineering, Vol. 4, pp. 1043–1055, 1991. However, this process is not effective when the ore contains large amounts of carbonaceous matter, because native carbonaceous matter has the ability to adsorb gold cyanide complex four times faster than activated carbon. B. J. Scheiner, *Relation of Mineralogy to Treatment Methods for Carbonaceous Gold Ores*, Society of Mining Engineers, 87–96, pp 1–6, 1987. Furthermore, CIL processes use relatively large carbon particles, whereas the ore is fine ground, so that the added carbon and its adsorbed gold values may readily be separated from the ore after cyanidation by size.

U.S. Pat. No. 4,188,208, hereby incorporated by reference, describes a method of high temperature carbon-in-leach (hot CIL). This method involves subjecting an aqueous slurry of carbonaceous ore to a preliminary oxidation step. Thereafter, the pulp is heated to a temperature greater than 167° F., and the ore leached using alkali metal cyanide concentrations greater than 0.1%. This method when tested on a pilot scale using ore containing 0.3 oz Au/ton ore produced activated carbon loaded to only 15 oz Au/ton and a final tail 0.045 oz Au/ton.

The disadvantages with the hot CIL process of 4,188,208 is that the high cyanide concentrations and high temperatures used in the process require the use of more expensive alkali metal hydroxides as well as the added cost to achieve the high cyanide concentrations and high temperature. Furthermore, it has been documented that, the equilibrium loading of gold onto carbon decreases with temperature. This decrease in loading of the activated carbon further increases the cost of the process, because it means that more carbon must be used and regenerated per unit of gold production.

4. Roasting

This is the current industry standard for simultaneously destroying carbonaceous matter, and simultaneously oxidizing the sulfide minerals, in refractory carbonaceous gold ores. In fact, the majority of recently built pretreatment plants use roasting. In Nevada, four roasters have been put into operation since 1986, and at least one more is in the planning stage.

Modern roasters use a fluidized bed construction and conventional fuel source to heat the ores. Roasting temperatures are usually between 600° and 700° C. After roasting, the ore is separated from dust and off-gasses and then quenched. Following quenching, the oxidized ore can be processed using traditional cyanide extraction techniques.

For any particular ore composition, roasting plants operate in a narrow range of tolerances. Below optimum temperature the carbon in the ore is not oxidized and remains actively preg-robbing. Above the optimum temperature, the gold in the ore becomes increasingly less amenable to cyanidation or other extraction techniques. Because of the degrading gold recovery with higher temperatures, many roasters are operated toward the lower side of the range. Blanking agents are then added to passivate any unroasted carbonaceous matter. Accordingly, roaster efficiency in a plant environment tends to vary widely with variation in feed stock.

For many years roasting was the only reliable method of treating refractory carbonaceous gold ores to produce high gold recovery. In the last two decades, however, the increasing costs associated with roasting has increased the pressure to find alternative methods for treating refractory carbonaceous gold ores. Roasting costs are driven in large part by two factors: energy economics and environmental regulation. Energy sources are used for both heating and process control, such as oxygen injection. As a result, this method is particularly sensitive to fluctuations in fuel prices. Environmental regulation is also a large and growing cost factor in the operation of roasters. The off-gas must be treated to suppress dust and to remove extremely toxic mercury and arsenic compounds and sulfur dioxide. This is often accomplished using electrostatic precipitators and scrubbers. These pollution control technologies, however, are both expensive and difficult to control.

As emission standards become stricter, roasting process costs increase dramatically. Almost without exception, both analytical studies and actual operators estimate the cost of roasting to be in the area of $10 to $20 per ton of ore, although one source claims an estimate for a proposed plant of $8 per ton.

5. Chemical Oxidation

Currently, hydrometallurgical methods for treating refractory gold ores strongly attract research and development activity. Currently, there are three aqueous oxidation techniques being given attention: (1) chlorine oxidation, (2) autoclave leaching and (3) bioleaching. Bioleaching is discussed separately.

a. Chlorination

This was the method most favored until process economics and environmental regulation tipped the scale in favor of roasting. At least two chlorination plants were operating recently, although one of them may already be off line.

In this process, the ore is ground and mixed with water to form a slurry. Chlorine gas is pumped into the slurry under pressure at a rate of about 60 to 120 lbs/ton, depending on the residence time, organic carbon concentration in the ore, and percent solids in the slurry. The chlorine gas will oxidize the carbon in the ore, rendering it less preg-robbing. After treatment, the hypochlorous acid generated must be treated with a reducing agent to prevent it from destroying the cyanide used later in the process.

This process is particularly sensitive to the amount of sulfide in the ore, because sulfur is oxidized before carbon. Higher sulfide ores require much more chlorine gas. For very refractory ores the "Double Oxidation" process described in P. Afenya, *Treatment of Carbonaceous Refractory Gold Ores*, Minerals Engineering, Vol. 4, pp. 1043–1055, 1991, hereby incorporated by reference, has been used.

Environmental factors also play a large part in driving costs. Gas emissions from the tanks must be captured by alkaline scrubbers before being released to remove the chlorine they contain. High pressure chlorine gas is extremely dangerous.

Finally, the process is difficult to control in operation, and plants suffer from the corrosive gas. As a result of all of these factors, roasting will be the economically favored alternative to chlorine based oxidation for the foreseeable future.

As a variant of chlorination, NaOCl can be substituted for chlorine gas as the oxidizing agent. Furthermore, NaOCl can be produced in situ by electrolyzing NaCl. The NaOCl is used in the same manner as the chlorine above to oxidize sulfides and carbonaceous matter in the ore. However, the initial capital investment for this technique is high, and unless there is a radical decrease in energy costs, this method will remain even less economically attractive than chlorination.

b. Pressure Autoclaving

This method is far more successful at oxidizing sulfidic materials that make the ore refractory than it is at oxidizing carbonaceous matter that may be present. It is mentioned here for the sake of completeness. A pressure autoclaving process followed by CIL is taught in U.S. Pat. No. 4,552,589, hereby incorporated by reference.

6. Bioleaching

This is the latest process being developed to treat refractory sulfide and carbonaceous gold ores. The process uses bacteria to biologically degrade sulfide minerals and liberate precious metal values so that they can be recovered by conventional technologies. The most widely used and studied bacteria for this process is *Thiobacillus ferrooxidans*. Bioleaching, however, has little effect on the preg-robbing characteristics of an ore. Therefore, carbon-in-leach or blanking has been used in addition to bioleaching to obtain satisfactory gold yields from carbonaceous ores. Furthermore, it takes days rather than hours to treat the ore.

Thus, since the mining of low grade carbonaceous gold ore began more than 40 years ago, the mining industry has repeatedly tried to find alternative methods of treating carbonaceous ore. These methods have all involved trying to eliminate or block the preg-robbing effect of these ores so that a traditional cyanide process could be used to recover the precious metal values from the ore. The inventor's process is a completely novel approach in which the heretofore deleterious preg-robbing characteristic of carbonaceous ores is used advantageously to concentrate the precious metal values in the carbonaceous ore on the preg-robbing component of the ore for subsequent recovery.

At present, there are large amounts of both located carbonaceous deposits and stocks of mined carbonaceous ore that have been set aside because they cannot be processed economically using current methods.

SUMMARY OF INVENTION

The present invention is directed to methods for recovering gold from carbonaceous gold ores whereby the carbonaceous component contained in the carbonaceous ores is used to concentrate the gold for subsequent recovery. To this end, a reverse leach-flotation process is provided, in which carbonaceous ore is contacted with a lixiviant solution thereby causing the production of gold-lixiviant complexes and the dissolution of gold from the ore. The carbonaceous component of the ore preg-robbingly concentrates the gold-lixiviant complexes in solution and is then separated from the bulk of the gangue material to form a concentrate. In a preferred embodiment of the present invention, gold is recovered from the carbonaceous component. The process is also applicable for recovering other precious metals such as silver and platinum from carbonaceous ores containing the same.

In a particularly preferred embodiment of the present invention, the gangue material, or tails, from the float is subsequently treated in a hot CIL process to further enhance recovery levels. The Hot CIL process of the present invention can also be used to obtain good recoveries from ores containing carbon in the form of graphite without first subjecting the ore to the reverse leach-flotation process of the invention.

Accordingly, it is an object of the present invention to provide an economical and effective process for recovering gold and other precious metals from carbonaceous ores using the inherent preg-robbing capabilities of these ores to concentrate gold and other precious metals in the carbonaceous component of the ore prior to separation. It is a further object of the present invention to provide a hot CIL process that can be used to enhance the Au recovery from the reverse leach process or that can be used to treat ores containing carbon in the graphite form. Additional and further objects and advantages of the present invention will appear hereinafter.

BRIEF DESCRIPTION OF THE DRAWINGS

FIG. 8 is a graph illustrating the gold remaining in the final tail as a function of the final concentration of cyanide in a 70° C., 16-hour hot CIL step;

FIG. 9 is a graph illustrating the gold remaining in a hot CIL tail of a high grade and low grade ore as a function of concentration of fresh cyanide added to the filtrate from the flotation step of a process according to an embodiment of the present invention;

DETAILED DESCRIPTION OF THE PREFERRED EMBODIMENTS

Figure 1:
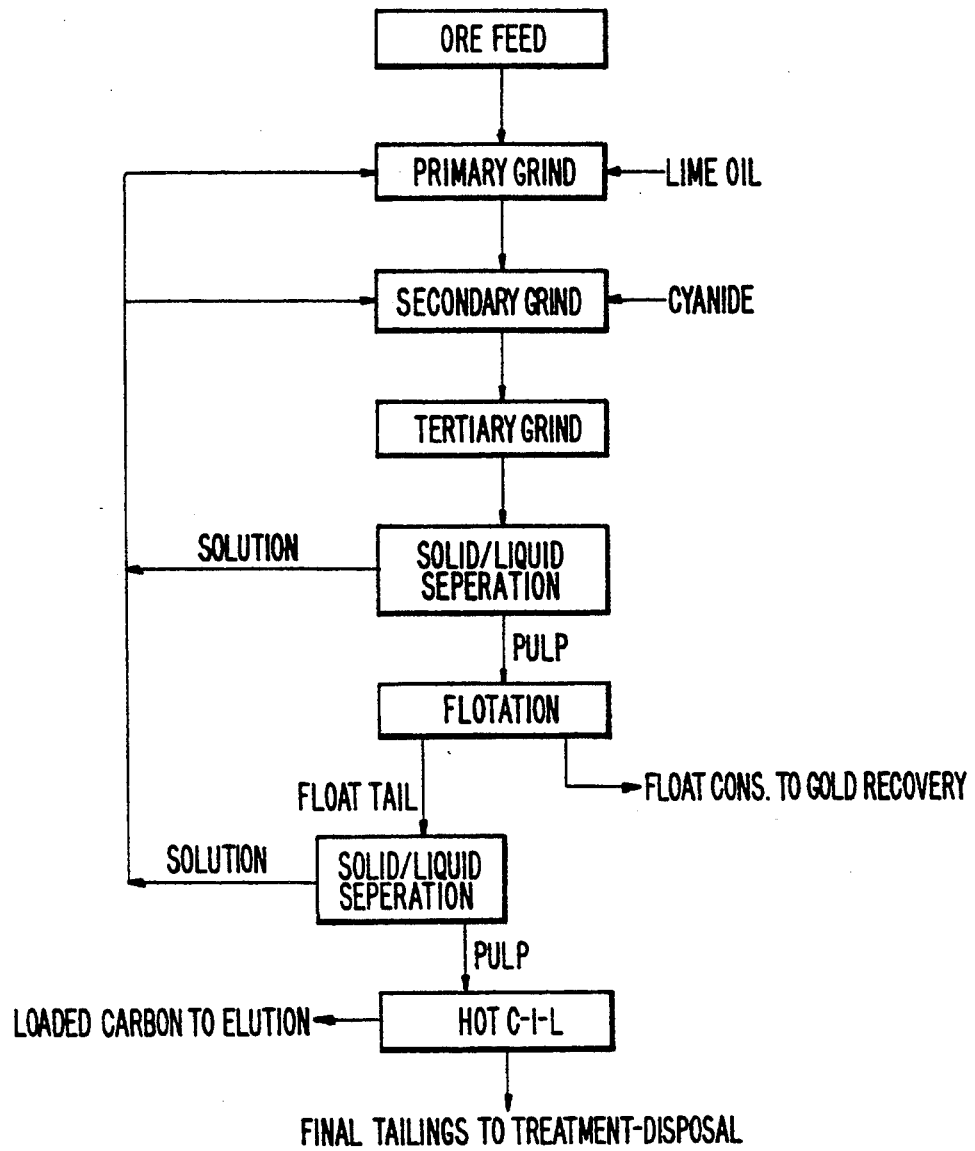
FIG. 1 is a general flow diagram of an embodiment according to the present invention.

The starting materials upon which the present invention operates have been termed "carbonaceous ores," a specific type of gold ore that contains a carbonaceous component capable of adsorbing various gold-lixiviant complexes including $Au(CN)^-_2$, $Au(S_2C_2N_4H_6)$ and $AuCl_3$. While any lixiviant that forms a gold-lixiviant complex that is adsorbed by the carbonaceous component of the ore may be used in the present method, cyanide is the preferred lixiviant.

According to the present method, carbonaceous ore is leached with a lixiviant solution to dissolve the gold from the bulk of gangue material. Thereafter, the gold-lixiviant complexes formed by leaching are preg-robbingly removed or sorbed by the carbonaceous component of the ore. After the gold is concentrated on the carbonaceous component of the ore, the carbonaceous component is separated from the ore and the gold recovered. Any of the conventional separation techniques known in the art may be used, including gravitational and froth flotation. The preferred separation technique is froth flotation, with column flotation being a preferred method of froth flotation.

Carbonaceous ores that can preg-robbingly remove about 10 $\mu$g Au/g ore or more in 16 hours or less from a cyanide solution spiked with 4 ppm Au are preferred in practicing the present invention. Carbonaceous ores that can preg-robbingly remove about 140 $\mu$g Au/g ore or more in 16 hours or less are most preferred. The ore should be finely ground to a particle size of at least −200 mesh prior to being contacted with the spiked gold cyanide solution.

The process in a particularly preferred embodiment of the present invention comprises:

(a) contacting ground carbonaceous ore with a lixiviant solution to form a slurry and thereby cause the production of gold-lixiviant complexes, which result in the dissolution of gold from the ore;

(b) preg-robbingly removing the gold-lixiviant complexes from solution to the carbonaceous component of the ore;

(c) conditioning the slurry with a collector;

(d) adding a frother to the conditioned slurry;

(e) separating the gold containing preg-robbing carbonaceous component from the bulk of gangue material by froth flotation; and (f) recovering gold from the carbonaceous component.

In this embodiment of the invention, the carbonaceous component of the ore is to be separated from the bulk of gangue material by froth flotation. The preferred method of froth flotation being column flotation. The largest particle present within a mass of mineral particles, which are to be separated by froth flotation, must be of a size such that the desired mineral particles will be physically released from unwanted mineral particles (or the gangue) and that the mass of each of the desired mineral particles does not exceed its force of attraction to an air bubble under the conditions of turbulence occurring in the aqueous suspension of mineral particles. Because the carbonaceous component of the ore is to be floated in this preferred embodiment of the invention, it is necessary to grind the carbonaceous gold ore fine enough so that the carbonaceous component is liberated from the gangue of the ore and the resulting particles of carbonaceous material are sufficiently small for separation by an industrial froth flotation process. In general, a final particle size of less than about 200 mesh is adequate. However, as explained in U.S. Pat. No. 5,051,199, hereby incorporated by reference, overgrinding of the ore must be avoided because small carbonaceous particles that are very small (less than approximately 1 micron) will not float as well as larger particles.

Although −28 mesh is generally considered suitable size for flotation, the nature of the ore being ground may require grinding to smaller sizes, e.g., −200 mesh, preferably −400 mesh, because flotation separation requires that the carbonaceous matter and gangue or matrix materials be present as distinct particles, separated from one another.

"Oxidized coal" particles are coal particles that are hydrophilic and poor floating. These coal particles are hydrophilic and poor floating because they are characterized by a high oxygen content (i.e., many oxygen-containing functional groups) at least on the surface of the coal particles. Thus, even if the carbonaceous particles are already liberated in the charge ore, the external surfaces of the coal particles will be the most oxidized areas, thereby making the carbonaceous particles difficult to float. And although the interior of the carbonaceous particles may also be quite oxidized, they are generally less oxidized than the external surface. Consequently, grinding the carbonaceous particles to size can have a profound effect on the overall effectiveness of the instant process.

Therefore, besides reducing the size of the ore to a size small enough for flotation, i.e., smaller than about 28 mesh, and liberating the carbonaceous matter from the other matrix materials (generally silica, clays, and other silicates), grinding also exposes fresh surfaces of the carbonaceous matter.

Grinding may be accomplished by any method known for mineral processing such as rod mills, ball mills, attrition mills, and the like. Grinding technologies that produce a narrow particle size distribution are preferred. Ball milling will produce a wide distribution of particle sizes. Hydrocyclones can be used to separate larger particles from the ball mill output for the purpose of regrinding before cyanidation and froth flotation. After the first flotation, hydrocyclones may also be used to remove larger particles of ore that still contain carbonaceous material that was not ground free of the gangue. These larger particles may contain adsorbed gold and can be reground, recyanidated and refloated in order to recover more gold.

Wet or dry grinding may be used to reach the final particle size. However, if a wet grinding process is used, it is preferred that the grinding be carried out in the presence of a lixiviant.

Once the carbonaceous gold ore is ground, it is leached with a lixiviant. Lixiviant as used herein is a solvent that is used to dissolve the gold in the carbonaceous gold ore by forming soluble gold-lixiviant complexes. Cyanide is the preferred lixiviant for practicing the present invention. However, other lixiviants such as aqua regia, thiourea, halide ion lixiviants and the like may also be used.

Sufficient lixiviant should be added to dilute the solids concentration of the ground ore to the range of between 100–600 gm/Kg, preferably about 400 gm/Kg. Naturally, if the ore is wet ground, less lixiviant solution, if any at all, will need to be added to dilute the solids concentration into the above range. The appropriate concentration of lixiviant in the leach solution depends on the lixiviant being used to solubilize the gold in the ore and the desired leach rate. The typical concentrations of the various lixiviants used to leach gold, however, are well-known in the leaching art.

The gold-lixiviant complexes formed during lixiviation are adsorbed by the carbonaceous component in the carbonaceous gold ore. This property of the carbonaceous component of the ore has been called "preg-robbing." Preg-robbing is believed to occur by both physical and chemical means. In the present invention, the process of preg-robbing, which has traditionally been considered deleterious to the processing of these ores, is used to concentrate the gold-lixiviant complex onto the carbonaceous component of the ore for subsequent recovery.

Lixiviation is carried out until equilibrium has been reached or substantially reached between the gold in solution and the gold adsorbed on the particles of carbonaceous matter in the ore. The time within which equilibrium is achieved varies with such factors as particle size, temperature, concentration of lixiviant, and rate of agitation or stirring.

Naturally, the gold that is occluded in the activated carbon component of the carbonaceous matter or chemically bound as a chelate by the organic acid component of the carbonaceous matter is also recovered when the carbonaceous matter is subsequently separated from the bulk of gangue material.

After lixiviation, the slurry may be transferred from the leaching vessel to a thickener and the slurry thickened for subsequent flotation. Solids levels of over 100 gm/Kg, preferably over about 300 gm/Kg of the ore may be used in the flotation process. However, these levels are not critical and higher or lower levels may oftentimes be used.

If the carbonaceous gold ore does not contain sufficient preg-robbing carbonaceous matter to completely adsorb the gold-lixiviant complexes, then the decanted lixiviant obtained from the thickener may be further processed by running it through a column of activated carbon to adsorb the remaining gold-lixiviant complexes in solution.

In another preferred embodiment of the present invention recycled carbonaceous matter from processed ore or finely ground carbon may be added to augment the preg-robbing capacity of the native carbonaceous matter. Such materials as coal, activated charcoal, ashed woodchips, synthetic resins, and the like may be used as the finely ground carbon.

If finely ground carbon is used to augment the preg-robbing capacity of the native carbonaceous matter in the ore, it is preferred that the finely ground carbon and the native carbonaceous matter be of similar particle sizes.

An advantage of augmenting the natural preg-robbing capacity of the ore is that the concentration of gold-lixiviant complexes in solution is lowered, driving the dissolution reaction forward and improving the adsorption kinetics; thus, more gold is solubilized and then concentrated in the carbonaceous component of the ore. Furthermore, augmentation ensures that sufficient carbon is floated off of the ore and that the overall removal of gold from the ore pulp is of sufficient efficiency to be economically useful.

In another preferred embodiment of the present invention, after lixiviation, NaCl, $(NH_4)_2SO_4$ or $Na_2SO_4$ salt is added to the ore lixiviant slurry. Preferably $(NH_4)_2SO_4$ or $Na_2SO_4$ is added because NaCl may cause excessive corrosion of processing equipment. The preferred salt concentration is about 5 weight %. Salt additions increase the polarity of the water in the lixiviant. Thus, salt makes the hydrophobic carbonaceous component of the ore even less attracted to the water and more attracted to the air in the flotation cell.

If a cyanide solution is used as the lixiviant it may be removed after cyanidation of the ore. The ore can then be resuspended in a 0.1N NaOH solution with 5% of $(NH_4)_2SO_4$ or $Na_2SO_4$ salt added. The final pulp density of the slurry is adjusted so that the solids level is over 100 gm/Kg, preferably over about 300 gm/Kg as indicated above. Replacement of the cyanide solution with a 0.1N NaOH solution minimizes the potential for the formation residual hydrogen cyanide gas during the subsequent flotation step. $Ca(OH)_2$ may be substituted for NaOH in the above solutions.

Before flotation, the aqueous slurry can be conditioned with a collector. The collector is a chemical compound that enhances the hydrophobic nature of the surface of the carbonaceous particles so that these particles are attracted to air rather than water.

The collector, which is used to render the carbonaceous component of the ore hydrophobic, may be any of the collectors conventionally used in the benificiation of carbonaceous matter by froth flotation. Some of the conventional collectors that may be used include: motor oil, high purity vacuum pump oil, kerosene, paint thinner, fuel oil, plant oils and the like. Aromatic oils such as those described in K. Han, et al., Separation of Carbonaceous Material from Carlin Ore by Flotation, Conference proceedings: Advances in Gold and Silver Processing, Reno, Nev., Sep. 10–12, 1990, Society for Mining, Metallurgy, and Exploration, Inc., p. 121, hereby incorporated by reference, may also be used. The preferred collectors of the present process are Jojoba oil and Meadowfoam oil.

Activators, flocculants, conditioning reagents, dispersing reagents, depressing reagents, etc. may also be used in conjunction with the collectors employed in the present process.

Dosages of collector ranging from about 0.1 to about 10 lbs./ton of ore may be used, preferably at least about 0.5 lb./ton.

Contact of the slurry with the collector used in accordance with the present invention is preferably accomplished after the pH of the slurry is adjusted to about 9.0–12.0. Of course, if the natural pH of the slurry falls within this range, no adjustment is necessary.

When the collector is added to the slurry, mixing for about 0.1 to 30 minutes, preferably from about 1 to 10 minutes, is conducted in order to ensure contact between droplets of the collector and the gold containing carbonaceous particles to be floated. The conditioning time depends on many variables including the collector composition and concentration, the degree of oxidation of the carbonaceous matter in the ore, and the solids concentration. Conditioning may be accomplished in the flotation cell or in a separate mixing vessel. The conditioner may also be added to the ore while it is being ground to size.

A frother is added to the aqueous slurry, and then the carbonaceous ore is floated in an appropriate flotation cell. Prior to flotation, however, the slurry is again conditioned for about 0.1 to 30 minutes, preferably from about 1 to 10 minutes. The frothing agent permits a froth of the required stability to be produced during the subsequent flotation of the aqueous slurry. Dowfroth 250 (polypropylene glycol methyl ether), MIBC or Aerofroth 88 are the preferred frothing agents. Dowfroth 250 is available from Dow Chemical in Midland, Mich., and Aerofroth 88 may be purchased from the American Cyanamid Colo., Bountiful, Utah.

During flotation of the aqueous slurry, a froth of the gold containing carbonaceous matter is produced. The froth is skimmed off, thereby separating the gold containing carbonaceous matter from the bulk of the gangue material. All non-floating particles are transferred to a thickener where a flocculent can be added and the lixiviant can be recovered for reuse. Prior to reuse, if the ore contains an insufficient amount of carbonaceous material to adsorb substantially all of the gold-lixiviant complex in solution and its preg-robbing capacity is not augmented with recycled carbonaceous matter or finely ground carbon, the lixiviant may be stripped of any gold values by running it through an activated carbon column.

In order to provide a cleaner concentrate, the flotation concentrate from a rougher flotation cell may be floated a second time in a cleaner flotation cell. The concentrate from the cleaner flotation cell being the final concentrate of gold containing carbonaceous matter.

Gold can be recovered from the concentrate of gold containing carbonaceous matter by either ashing the carbonaceous matter in a roaster or stripping the gold using an eluant such as hot cyanide. Such a stripping process is disclosed in U.S. Pat. No. 4,188,208, hereby incorporated by reference. The process disclosed in U.S. Pat. No. 3,979,205, hereby incorporated by reference, may also be used to recover the gold from the floated carbonaceous component of the ore.

In another aspect of the present invention, the process further comprises a technique for processing carbonaceous gold ores that contain occluded gold in the sulfidic mineral component. If economically significant quantities of gold remain occluded in the sulfidic component of the ore after fine grinding, then the sulfides may be oxidized to liberate the encapsulated gold and make it amenable to lixiviation. The oxidizing pretreatment is carried out prior to cyanidation and may be any of the conventionally used oxidizing pretreatments for sulfide minerals. However, the selected pretreatment must be mild enough to avoid oxidation of the carbonaceous component of the ore. Such oxidizing pretreatments include autoclaving and bioleaching, especially with *Thiobacillus ferrooxidans*. Autoclaving is described in U.S. Pat. No. 4,610,724, hereby incorporated by reference. A bioleaching process that may be used in the present invention is described in Hutchins, et al., *Microbial Pretreatment of Refractory Sulfide and Carbonaceous Ores Improves the Economics of Gold Recovery*, Mining Engineering, April 1988, at 249, hereby incorporated by reference.

Alternatively, the sulfidic component of the ore may be separated from the carbonaceous ore by flotation and then treated separately using well known techniques such as roasting to recover the occluded gold.

The following examples are set forth for the purpose of illustrating the invention only and are not to be construed as limitations on the present invention except as set forth in appended claims. All parts and percentages are by weight unless otherwise specified. All of the carbonaceous ores used in the examples have the capacity of preg-robbingly removing about 140 $\mu$g Au/g ore in 16 hours or less from a cyanide solution spiked with 4 ppm Au.

EXAMPLE 1

A sample of carbonaceous gold ore from eastern Nevada containing approximately 1% organic carbon and approximately 0.15 oz./ton of gold was pulverized in a ball mill at about 60 to 70% solids. After 1.25 hrs. at 72 rpm the pulp was diluted with water and passed through a 400 mesh sieve. The ore that did not pass the 400 mesh sieve was weighed and found to be less than 5% of the total weight. The −400 mesh ore was made into a pulp of approximately 40% solids with 1000 ppm CN (1.73 g KCN/liter) and 0.1N NaOH. The final pH of the pulp was greater than 12.0. The carbonaceous ore-cyanide pulp was mixed for 72 hours at room temperature. The solution was then removed by filtration and the wet ore resuspended in 0.05N NaOH and 3% by weight NaCl. The cyanide treated ore was then conditioned at 10% pulp density in a Wemco 600 gm flotation cell with a collector of Jojoba oil at a concentration of 0.04 ml/liter. After 5 minutes of mixing the same volume of Dowfroth 250 was added and mixed for an additional 5 min. Air was then introduced to produce a black carbon containing froth which was collected for 5 min. The flotation process was repeated four more times with the addition of more collector and frother each time. Samples of the floated concentrate, the ore remaining in the cell after flotation was complete, and the ground ore at the start of the experiment were all analyzed for gold by the same method. The recovery of gold was calculated from the weight of gold in the ore. The concentrate in example 1 had 76% of the total gold recovered in 20% of the total weight of ore.

EXAMPLE 2

A sample of gold ore like the one used in example 1 was pulverized in a ball mill at about 60 to 70% solids for 1.25 hours at 72 rpm to pass a 400 mesh sieve. The ore passing the 400 mesh sieve was leached with 1000 ppm cyanide (1.7 g KCN/liter) and in 0.1N NaOH at 40% solids. The ore-cyanide pulp was mixed for 72 hours at room temperature. The cyanide solution was removed by filtration and the wet ore was resuspended in 0.1N NaOH and 3% by weight NaCl. The ore was then conditioned at 10% pulp density with a collector of Meadowfoam oil at 0.04 ml/liter. After 5 minutes of mixing the same volume of dowfroth 250 was added and mixed. Then air was introduced and the froth collected for 5 minutes. This process was repeated four more times. Samples were analyzed for gold and the concentrate contained 74.4% of the total gold in 14.4% of the total weight.

EXAMPLE 3

A sample of gold ore like the one in examples 1 and 2 was pulverized the same way and then leached with 1000 ppm cyanide (1.7 g KCN/liter) in 0.1N NaOH at 40% solids for 48 hours with open mixing at room temperature. The cyanide was removed by filtration and the wet ore resuspended in 0.1N NaOH and 3% NaCl. The ore was then conditioned at 10% pulp density with a collector of Meadowfoam oil at 0.04 ml/liter. A concentrate was collected as before and analyzed for gold. The concentrate contained 78.3% of the total recovered gold in 16.7% of the weight.

EXAMPLE 4

The same test was made on 48 hour leached ore using 5 flotations and collections using 0.04 ml/liter Jojoba oil and Dowfroth 250. The concentrate contained 81.4% of the total recovered gold in 16% of the total weight of ore.

EXAMPLE 5

The same test was made on ore that was leached for 24 hrs. Five flotations were done with 0.04 ml/liter of Meadowfoam oil and Dowfroth 250. The concentrate contained 78% of the total gold in 17.8% of the total weight of ore.

EXAMPLE 6

The same test was made with an ore that was leached for 16 hr. The filtered ore was resuspended in 0.1N NaOH, 5% $(NH_4)_2SO_4$ and then floated 5 times with the Meadowfoam Dowfroth 250 method used in examples 2, 3, and 5. The concentrate contained 84.4% of the total recovered gold in 23.4% of the total ore weight.

EXAMPLE 7

A sample of carbonaceous gold ore containing 0.009 oz./ton of gold and approximately 1% organic carbon was pulverized in a ball mill for 30 minutes to pass a 200 mesh sieve. The −200 mesh ore was leached with a 1000 ppm cyanide and 0.1N NaOH solution for 16 hours. The cyanide was removed, and the ore was conditioned in 0.1N NaOH and 5% by weight NaCl solution with a collector of Meadowfoam oil (0.04 ml/liter) for 5 minutes. Dowfroth 250 (0.04 ml/liter) was added and the slurry was again conditioned for 5 minutes. Air was introduced and black froth collected for over 20 minutes. The flotation process was repeated 2 more times with about 10 minutes of collection each time. Samples of floated concentrates and tails were dried and weighed and then analyzed for gold by the same method. The concentrate contained 65% of the gold in 14% of the weight. The tail contained 1.25 ppm or 0.036 oz./ton of gold or 34.5% of the gold in 86% of the weight.

EXAMPLE 8

A sample of the same ore used in example 7 was prepared in a similar manner except the ore was not leached with cyanide. The ore was floated with 3 additions of Meadowfoam oil (0.04 ml/l) and Dowfroth 250 (0.04 ml/l). Conditioning times were the same as in Example 7. The concentrate contained 43% of the gold in 18% of the ore weight. The tail contained 2.0 ppm or 0.058 oz./ton of gold or 57% of the gold in 82% of the weight.

Therefore, a comparison of this example with Example 7 illustrates the ability to the present invention to concentrate gold using the preg-robbing component of the ore.

EXAMPLE 9

A sample of carbonaceous gold ore containing 0.085 oz/ton gold and about 1% organic carbonaceous matter was pulverized in a ball mill for 15 minutes. The ground ore was passed through a 400 mesh sieve. The +400 mesh ore was ball mill ground again for 15 minutes and then passed through a 400 mesh sieve. This process was repeated until at least 90% of the ore had passed the 400 mesh sieve. The −400 mesh ore was leached with 1,000 ppm cyanide and 0.1N NaOH for 16 hours. The cyanide was removed and the ore conditioned in 0.1N NaOH, 5% NaCl, solution and floated with Meadowfoam oil as a collector and Dowfroth 250 as a frother as in Example 7 and 8. Samples of floated concentrates were dried, weighed and analyzed for gold. The concentrate contained 71% of the gold in 24% of the weight and the tail contained 29% of the gold. A sample of tail was also taken and tested in a laboratory column flotation cell of 40 cm.×5 cm. with a porous glass bottom into which air was introduced to make small bubbles. After approximately 30 minutes the black concentrate was collected and analyzed for gold. The column flotation was able to remove an additional 25% of the gold in the tail from the Wemco flotation cell while only removing 5% of the gangue.

EXAMPLE 10

A sample of carbonaceous gold ore containing 0.085 oz/ton gold was pulverized in a ball mill for 30 minutes. The ground ore was left to settle out for 10 minutes, then all the ore that had not settled passed 36 cm. from the top of the original water level was removed. This method of settling was done to produce ore that was approximately 20 microns or smaller in size. This process was repeated three times and the +20 micron ore was reground for 30 minutes. After more than 90% of the ore was ground to less than 20 microns the ore was leached in 1,000 ppm cyanide and 0.1NaOH for 16 hours. The cyanide was not removed but diluted to 500 ppm and 0.1N NaOH with 5% $Na_2SO_4$ added with Meadowfoam oil (0.04 ml/l) for conditioning. The slurry was conditioned for 5 minutes with Meadowfoam oil (0.04 ml/l) as in the previous example. Flotation was done with Dowfroth as a frother as before. A total of 3 flotations and collections were done in a Wemco float cell before a sample from the tail was taken for column flotation. After the tail from the Wemco flotation was dried and weighed and a sample removed for analysis, the remaining sample of 283 grams was leached again in 1,000 ppm cyanide at 30% density with 5% $Na_2SO_4$ and 0.1N NaOH and 25 gm/liter of activated carbon. After 24 hours the carbon was removed by filtration and the carbon and the remaining ore were analyzed for gold. The results are listed below.

TABLE I
RESULTS OF FLOTATION TESTS

|  | % Gold | % Weight | Au ppm | Au oz./ton |
|---|---|---|---|---|
| Gold In Wemco Concentrate | 67.83 | 26.4 | 6.72 | 0.195 |
| Gold In Wemco tail | 30.10 | 68.4 | 1.15 | 0.033 |
| Gold in column concentrate | .46 | .26 | 4.55 | 0.132 |
| Gold in column tail | 1.61 | 4.9 | .85 | 0.025 |

TABLE II
CIL TEST RESULTS OF WEMCO TAILS.

|  | Total μg Au | % Au From Wemco Tail | Au ppm | Au oz./ton |
|---|---|---|---|---|
| Gold in carbon | 96.4 μg | 29.6 | 3.85 | 0.112 |
| Gold in final tail | 229 μg | 70.4 | 0.82 | 0.024 |

A comparison of the results from Table I and II illustrates that either a column flotation or CIL of the Wemco float tails reduces the gold in the final tail to approximately 0.85 ppm or about 0.025 oz/ton. Thus recovering about an additional 25% of the gold in the Wemco tail.

A particularly preferred method of practicing the present invention is described in connection with FIG. 1. FIG. 1 represents a general flow diagram of the process according to the present embodiment of the invention. As can be seen from FIG. 1, the process involves the reverse leach-flotation process discussed above in combination with a hot CIL treatment of the tails from the flotation process.

The process can be divided up into three major steps. The three steps are (1) grinding/leaching, (2) flotation of the native gold loaded carbon, and (3) hot CIL leach of the flotation tails.

The advantage of combining the hot CIL leach step of the present embodiment of the invention to the reverse leach-flotation process described above is that the overall gold recovery for the entire process is improved. This is because following the flotation step of the reverse leach-flotation process described above, there will always be some gold and carbonaceous material remaining in the tails. The amount of carbonaceous material remaining in the tails depends upon how much of the carbon was liberated from the gangue during grinding and the efficiency of the flotation process. The amount of carbon remaining in the tail after the carbon float, however, is much smaller than the amount of carbon normally used in a carbon in leach or a carbon in pulp process. Therefore, by subjecting the tail of the reverse leach-flotation process to hot CIL, a significant portion of the gold remaining in the tail of the reverse leach-flotation process can be recovered. This is illustrated graphically in FIG. 2.

In the process according to the present embodiment of the invention, after flotation of the aqueous ore slurry, the remaining ore, or tails, is treated with cyanide or other lixiviant in a carbon in leach or carbon in pulp process. (For purposes of this disclosure, carbon in leach, or CIL, shall encompass both carbon in leach processes and carbon in pulp processes.) The residual cyanide in the pulp following the reverse leach-flotation step may be sufficient to dissolve or transfer the remaining gold from the ore to the activated carbon added during the carbon in leach step. Alternatively, additional cyanide may need to be added to increase the cyanide concentration in the pulp to a sufficient level to dissolve the remaining gold that is susceptible to dissolution.

The carbon in leach step should be carried out at a temperature between ambient and approximately 80° C. depending on the particular ore and economic considerations. If, however, the carbon in leach is carried out at ambient temperatures, the gold cyanide complex or other gold lixiviant complex will tend to stay with the native carbon and only very slowly transfer to the added activated carbon. Heating of the ore pulp increases the rate at which the gold cyanide complex transfers from the remaining native carbonaceous material in the ore to the added activated carbon.

A gold ore that contains only small, micron size free gold should permit the dissolution of the gold from the ore fast enough that most or the leaching should be completed by the time the pulp reaches the hot CIL step of the process. Therefore, because high levels of cyanide are not required to transfer gold from the native carbonaceous material, which already exists as a gold cyanide complex, to the added activated carbon, the cyanide concentration generally does not need to be maintained at high levels. If, however, there are larger particles of gold in the ore this step may take more time.

Because heating of a cyanide lixiviant solution may drive off cyanide as well as oxygen, which would reduce the rate of gold oxidation or leaching, it might be best to leach longer at ambient temperature before increasing the temperature. This is best determined experimentally.

Following the flotation step, the tail resulting from the reverse leach-flotation step, which still contains some residual cyanide, is adjusted to an appropriate pulp density for the hot CIL step. This can be done in one of two ways. The lixiviant can be separated from the tailings and the tailings repulped before the hot CIL step, or the tailings can simply be thickened following flotation to the appropriate pulp density. The preferred range of pulp density for the hot CIL step is approximately 30 to 40%, but others can be used. When pulping the tail, a solution containing lime ($Ca(OH)_2$), to maintain an alkaline pH, and additional cyanide, if needed to increase the cyanide concentration, is used. The final cyanide concentration of the pulp is preferably between 50 ppm CN and 500 ppm CN, which is the equivalent of approximately 0.5 to 3 lbs. NaCN/ton of ore.

After the appropriate pulp density is reached, activated carbon is added to the pulp. The amount of activated carbon that is added is preferably about 20 to 25 g/l. The mixture is then stirred or rolled at an elevated temperature. The temperature range for the hot CIL process is preferably 30° C. to 83° C., more preferably the temperature range is 30° C. to 70° C. Even more preferably the temperature at which the hot CIL process is carried out is within the temperature range of 50° C. to 70° C., and most preferably, the hot CIL process is carried out at a temperature of approximately 70° C.

Figure 2:
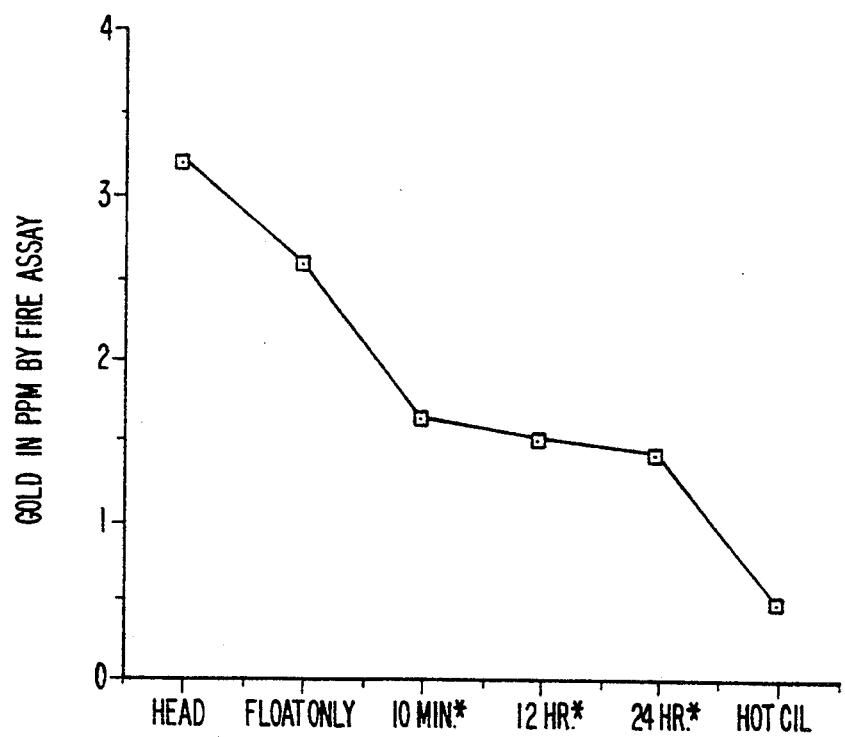
FIG. 2 is a graph illustrating the change in the gold values in an ore throughout a combined reverse leach-flotation and hot CIL process according an embodiment of the present invention.

FIG. 2 illustrates the change in gold concentration in an ore throughout the combined reverse leach-floatation and hot CIL process. The data used to produce FIG. 2 is shown in tabular form in Table III. The data in Table III shows that the hot CIL step extracted an additional 0.96 ppm of Au out of the 24 hour flotation tails (or 68.3% of the Au remaining in the tails): thus, a significant portion of the gold remaining in the tail after flotation was recovered in the hot CIL step. This improved the overall recovery for the process from 56.4% to 86.2%.

TABLE III

| | Au Content By Fire Assay (PPM) |
|---|---|
| Ore Head | 3.22 |
| Float Only | 2.6 |
| *10 min. | 1.64 |
| *12 hr. | 1.507 |
| *24 hr. | 1.404 |

TABLE III-continued

| | Au Content By Fire Assay (PPM) |
|---|---|
| hot CIL | 0.445 |

*The time refers to the time the ore was leached with cyanide prior to flotation.

The data of table III was produced using a low grade ore containing 3.22 ppm Au as a starting material. A 500 g sample of the ore was ground to 98% passing 400 mesh by grinding in a small ball mill for 75 minutes. In this case, the ore was wet ground in the presence of 250 ml of water and 0.25 ml of Meadowfoam oil. No cyanide was added to the ball mill. After grinding, the ore was made into a cake by filtration, and the cake was divided into equal wedges that each contained approximately 50 grams of ore. These samples were then leached with a solution containing 500 ppm CN and 2.5 g/l $Ca(OH)_2$. The leaching was carried out at 50° C. for various periods of time from 10 minutes to 24 hours. At the end of the designated periods of time in FIG. 2 and Table III, an additional 150 ml of water containing 5 weight % $Na_2SO_4$ and 20 $\mu$l of Dowfroth 250 was added to each 50 g sample. After vigorous mixing, each sample was floated in the column flotation cell used in Example 9 for at least 20 minutes. Both the concentrate and the flotation tail were dried, weighed, and analyzed for gold. FIG. 2 graphically illustrates the fire assay gold values in ppm for the starting ore sample, the column flotation tail sample without any cyanide leach, a 10 minute leach sample, a 12 hour leach sample, and a 24 hour leach sample. The last point of FIG. 2 represents the fire assay gold value of the final tail of a complete process using both a cyanide leach before flotation and a 16 hour, 70° C. hot CIL process after flotation.

During the hot CIL step, the gold remaining in the ore will decrease rapidly at first and then slow to a very slow rate of change. This is graphically illustrated in FIGS. 3–6. This approach can be used to determine the optimum time for the hot CIL step for any carbonaceous ore that is to be processed according to the present invention.

Figure 3:
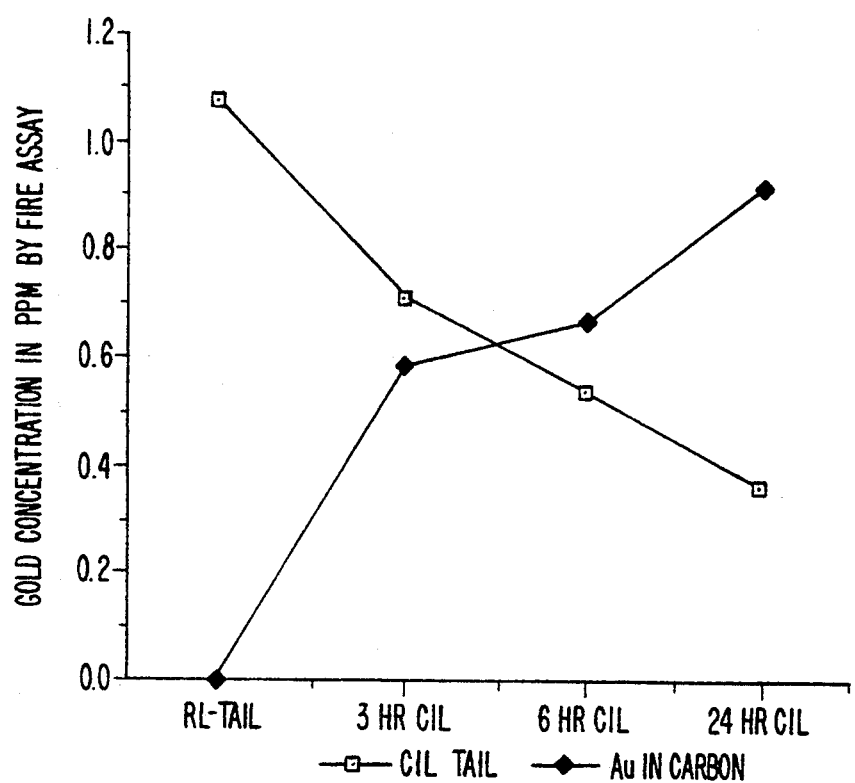
FIG. 3 is a graph illustrating the concentration of gold over time in a hot CIL tail and in the activated carbon used in the hot CIL step.

The ore sample used in FIG. 3 was first ground with cyanide and a collector for the appropriate amount of time to reach a target mesh size. The ore sample was then floated to produce a concentrate and flotation tail. The flotation tail, as illustrated in FIG. 1., represents the starting material of the hot CIL process. The time required for the hot CIL step was then experimentally determined by analyzing the ore tail after various amounts of time in the hot cyanide with activated carbon.

Figure 4:
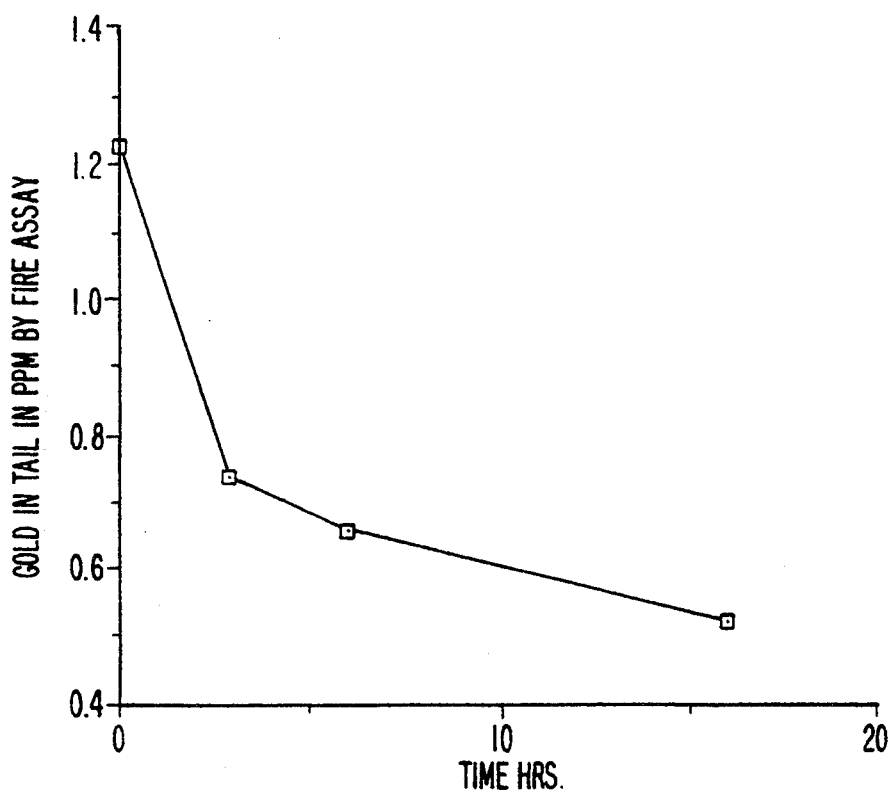
FIG. 4 is a graph illustrating the concentration of gold over time in a hot CIL tail for another ore.

FIG. 4 is an example of another ore that was tested to determine the time required to treat the flotation tails in the hot CIL step in order to obtain a sufficiently low Au concentration in the tails to make the process economic.

Figure 5:
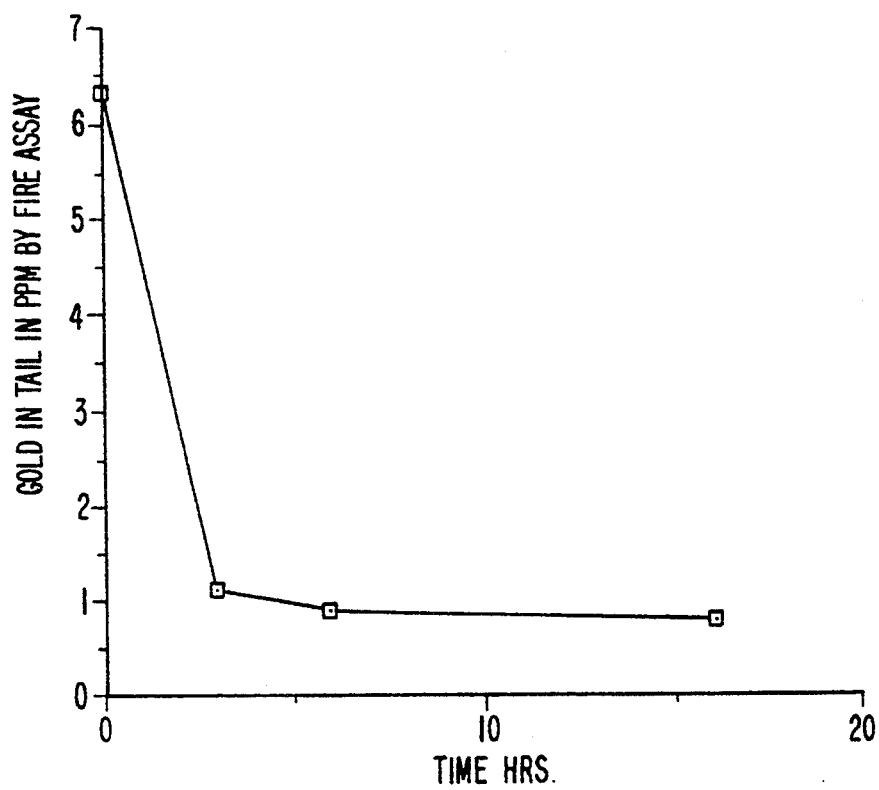
FIG. 5 is a graph illustrating the concentration of gold over time in a hot CIL tail for a high grade ore.

FIG. 5 is an example of a third ore sample prepared by flotation and then treated with hot CIL. The ore used to produce the data of FIG. 5 was a Nevada carbonaceous ore of higher grade than the ores used in FIGS. 3 and 4. This ore shows a dramatic drop in the Au concentration after approximately 3 hours. Extraction of the Au from the ore then slows between 3 and 16 hours.

Figure 6:
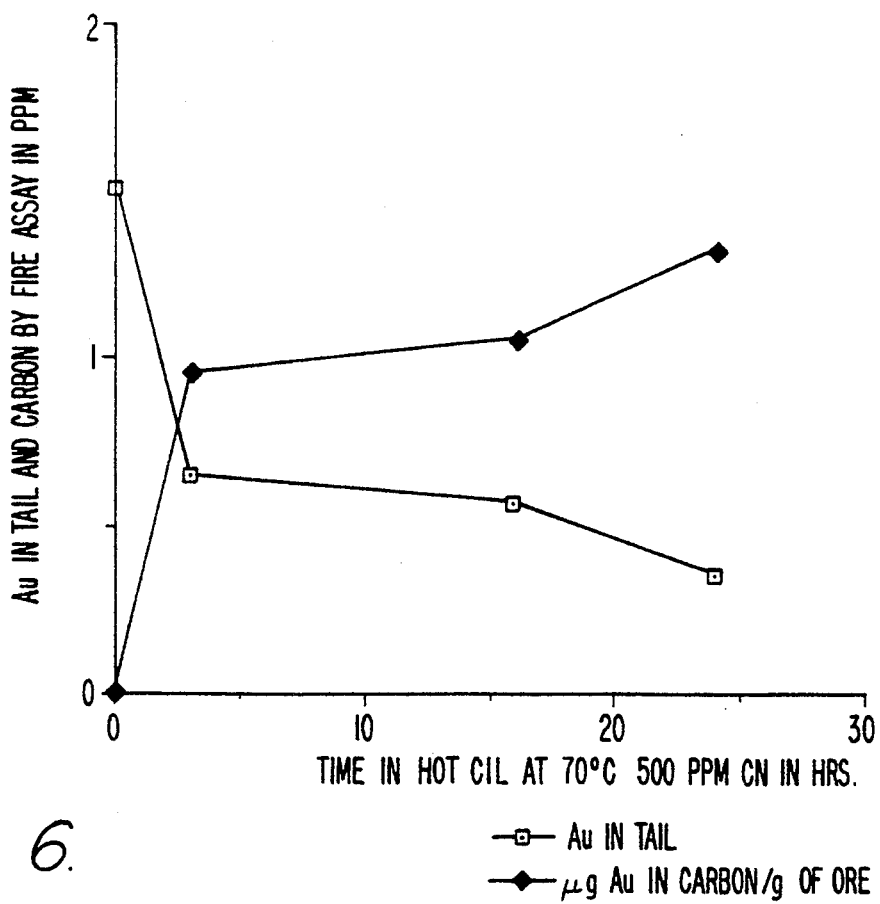
FIG. 6 is a graph illustrating the concentration of gold over time in a hot CIL tail and the activated carbon used in the hot CIL step for yet another ore.

The plot in FIG. 6 not only graphically illustrates the extraction of gold from an ore during the hot CIL step but also illustrates the amount of gold adsorbed by the activated carbon added to the hot CIL process. The curve representing carbon loading over time is the mirror image of the curve representing the extraction of gold from the tail over time.

Several examples are now provided to further illustrate the invention according to the present embodiment.

EXAMPLE 11

Figure 7:
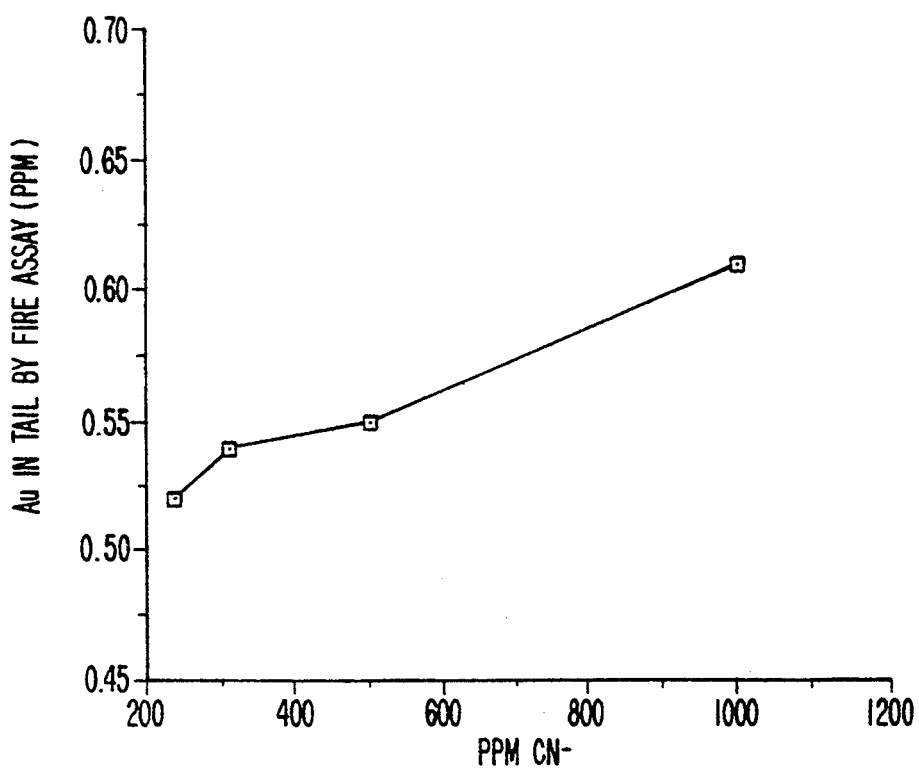
FIG. 7 is a graph illustrating the gold remaining in the final tail as a function of the initial concentration of cyanide in a 70° C., 16-hour hot CIL step.

The rate of transfer of gold from the tail to the added activated carbon will depend somewhat on the amount of cyanide in the hot CIL step. FIG. 7 illustrates the amount of gold remaining in the final tail of the process as a function of the initial concentration of cyanide in a 70° C., 16 hour hot CIL step.

To obtain the graph shown in FIG. 7, a 500 g sample of ore was ground to more than 90% passing 200 mesh in a solution containing $Ca(OH)_2$ and cyanide. The concentration of $Ca(OH)_2$ in the grind/leach solution was 2.5 g/l, and cyanide was added in the form of KCN in an amount equal to approximately 2.0 lbs. of NaCN/ton of ore. Meadowfoam oil was also added as a collector to the grinding solution in an amount of 0.5 ml/Kg of ore. After grinding the pulp density of the ore was approximately 67%. The ore was then allowed to leach for approximately 30 minutes. Following the leach, the ore was diluted to a pulp density of about 20% with a solution of 2.5 g $Ca(OH)_2/l$ and 5% by weight $Na_2SO_4$. The ore was then conditioned with 0.1 ml of Dowfroth 250 for 5 minutes and floated. After approximately 25 minutes of flotation the tail was filtered to make a cake of ore. Equal wedges of wet ore were taken to yield the equivalent of approximately 50 grams of dry ore. Each sample was combined with 2.5 grams of activated carbon (25 g/l) and 80 ml of a 2.5 g/l $Ca(OH)_2$ solution containing various amounts of a concentrated KCN solution. The initial concentration of cyanide in the hot CIL solution was calculated by dilution from the known concentration of the KCN solution. At the end of 16 hours of shaking at 70° C. each sample was removed and the carbon, ore, and liquid separated. The liquid was then analyzed for cyanide and the ore and carbon each analyzed for gold. FIG. 8 shows the final gold value in the tail as a function of the final cyanide concentration in ppm of cyanide ion.

Figure 15:
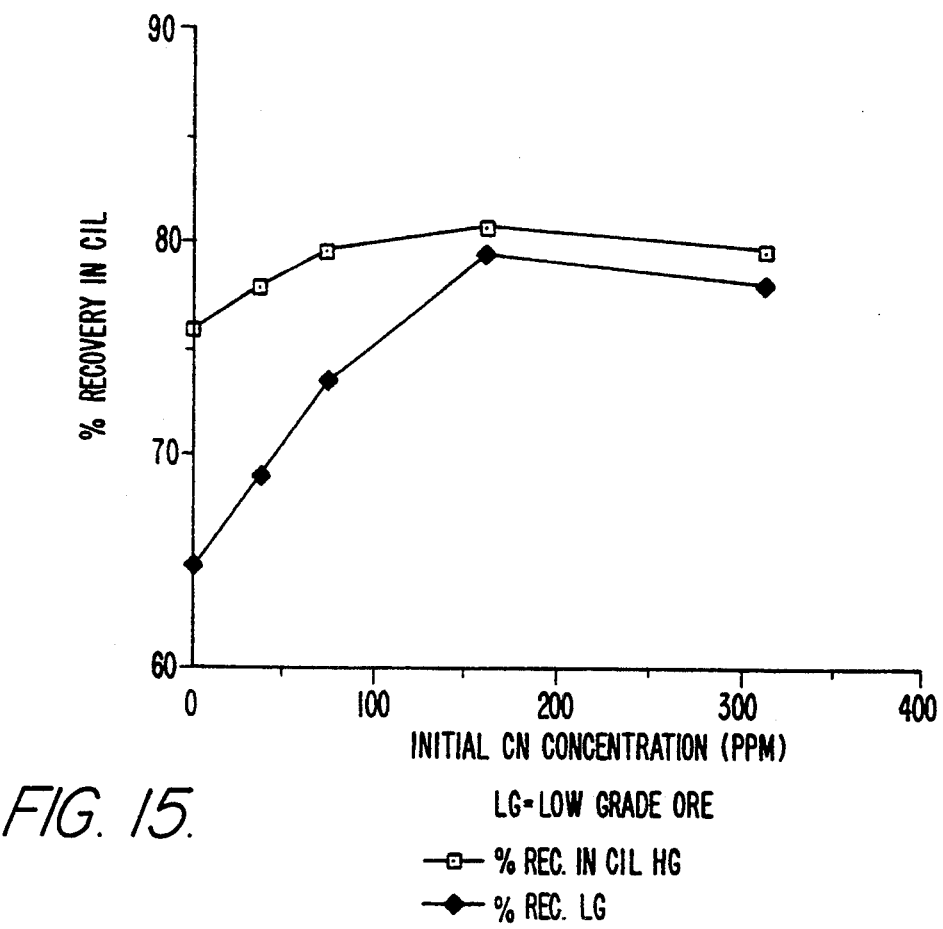
FIG. 15 is a graph illustrating the percent of gold recovery in a high and low grade ore as a function of initial cyanide concentration during the hot CIL step of a process according to the present invention.

FIG. 7 illustrates that as the initial cyanide concentration is lowered, the concentration of gold in the final tail is also lowered, at least down to an initial concentration of approximately 250 ppm CN. Similarly, FIG. 8 illustrates that as the final cyanide concentration is lowered, the concentration of gold in the final tail is also lowered, at least down to a final cyanide concentration of approximately 50 ppm CN. FIG. 15 further illustrates that the percent of Au recovery during the hot CIL process alone peaks at an initial cyanide concentration of approximately 150 ppm for both the high and low grade ore.

EXAMPLE 12

Figure 10:
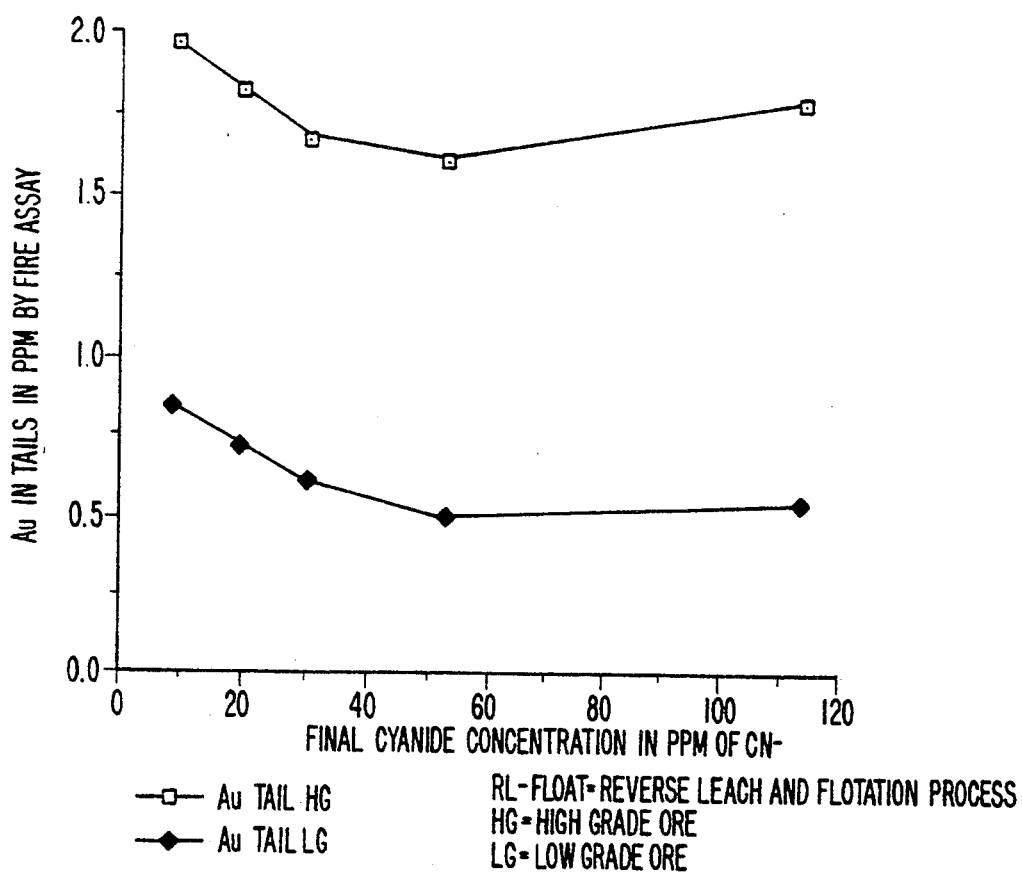
FIG. 10 is a graph illustrating the gold remaining in a tail of a high and low grade ore as a function of final cyanide concentration after a process according to the present invention.

In Example 12 a 500 g sample of high grade (12.6 ppm Au) and 500 g sample of low grade (3.5 ppm Au) carbonaceous ore were each ground in a solution of calcium hydroxide and cyanide. The concentration of $Ca(OH)_2$ in the grind/leach solution was 2.5 g/l, and cyanide was added in the form of KCN in an amount equal to approximately 1.0 lbs. of NaCN/ton of ore, which resulted in a cyanide concentration of approximately 500 ppm. Meadowfoam oil was also added to the grinding solution in an amount of 0.5 ml/Kg of ore. After grinding the ore for 15 minutes approximately 90% of the ore was minus 200 mesh. The pulp density of ground ore was approximately 67%. The 67% pulp density ore was diluted with a solution of 2.5 g $Ca(OH)_2/l$ and 5% by weight $Na_2SO_4$ to a pulp density of about 20%, the ore was then conditioned in a Wemco flotation cell with 0.1 ml of Dowfroth 250 for 5 minutes. Air was then introduced to the flotation cell and the resulting froth collected for 20 minutes. After 20 minutes of flotation, the tail was again made into a cake and divided into wedges. The filtrate was added back to each wedge and increasing amounts of fresh cyanide were added to the filtrate of each sample as illustrated in FIG. 9. After shaking for 16 hours at 70° C., each sample was analyzed. FIGS. 9 and 10 illustrate the final gold values in each hot CIL tail sample as a function of the initial and final cyanide values, respectively. This experiment shows that best results are obtained when the initial cyanide concentration for the hot CIL process is 100 to 300 ppm or when the final cyanide concentration of the hot CIL process is 50 to 100 ppm. FIGS. 9 and 10 also show that the best recovery is achieved for both the high grade (12.6 ppm Au) and low grade (3.5 ppm Au) ores within the same cyanide concentration range.

EXAMPLE 13

The rate of transfer of gold from a reverse leach-flotation tail to activated carbon will depend on the temperature of the leach solution during the hot CIL step and can be determined experimentally. To illustrate this principle, low grade (3.5 ppm Au) ore was ground in a solution containing 2.5 g $Ca(OH)_2/l$ and cyanide. Cyanide was added in the form of KCN in an amount equal to approximately 1.0 lb. NaCN/ton of ore to produce a solution containing approximately 500 ppm CN. Meadowfoam oil was also added to the grinding solution in an amount of 0.5 ml/Kg of ore. Grinding was carried out for 75 minutes so that 98% of the ore would pass 400 mesh. The pulp density after grinding was approximately 20%. The ore pulp was then diluted with a solution containing 2.5 g $Ca(OH)_2/l$ and 5% by weight $Na_2SO_4$ to a pulp density of approximately 20%. After the pulp density was adjusted, the ore was floated as before for 25 minutes after conditioning with 0.1 ml Dowfroth 250 per 500 g of ore. The flotation tail was made into a cake by filtration, and approximately 30 g samples of the ore tailings were treated with a cyanide lixiviant having a concentration of 500 ppm CN and 2.5 g $Ca(OH)_2/l$. The pulp density during the hot CIL step was approximately 30%. Furthermore, the pulp contained approximately 25 g activated carbon per liter. Ore tail samples were tested for Au at 3, 6 and 24 hours for the following hot CIL temperatures: 30° C., 50° C., 70° C., and 83° C. In addition, a sample was tested at 36 hours for the flotation tails leached at 83° C. The results of these tests are illustrated in FIGS. 11, 12, and 13.

Figure 11:
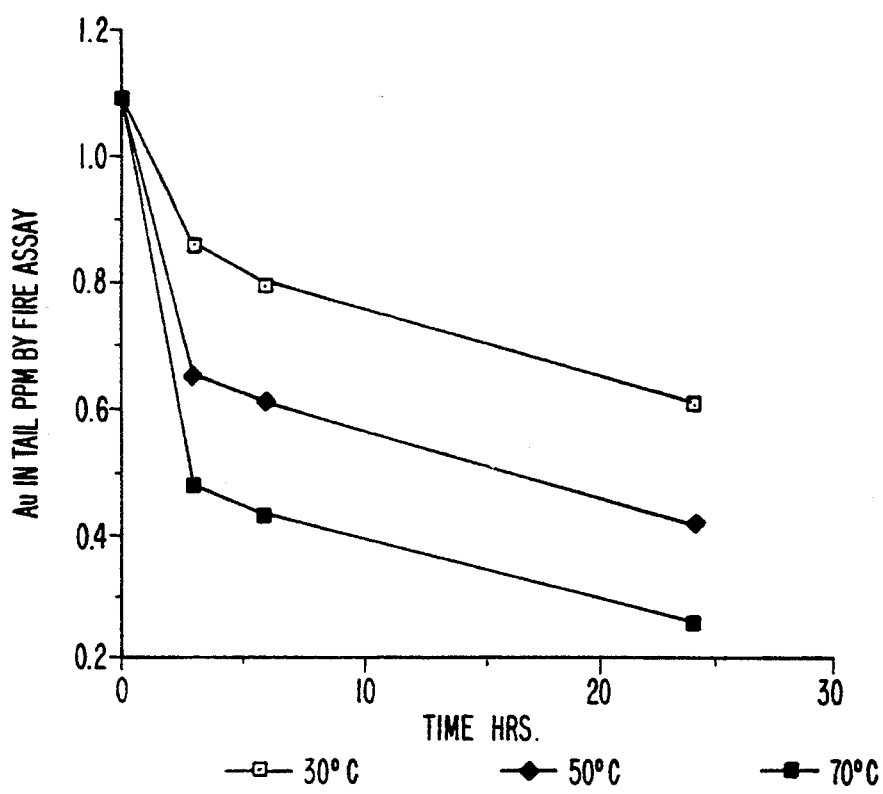
FIG. 11 is a graph illustrating the gold concentration in hot CIL tails according to a process of the present invention as a function of time for various hot CIL temperatures.
Figure 12:
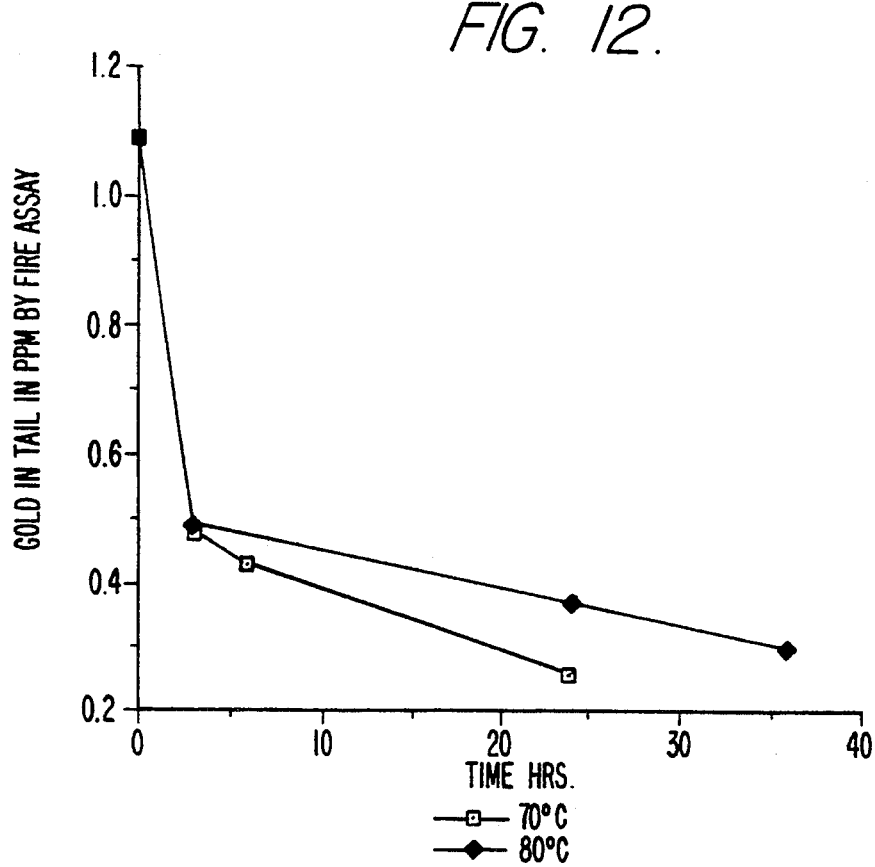
FIG. 12 is a graph illustrating the gold concentration in hot CIL tails according to a process of the present invention as a function of time for various hot CIL temperatures.
Figure 13:
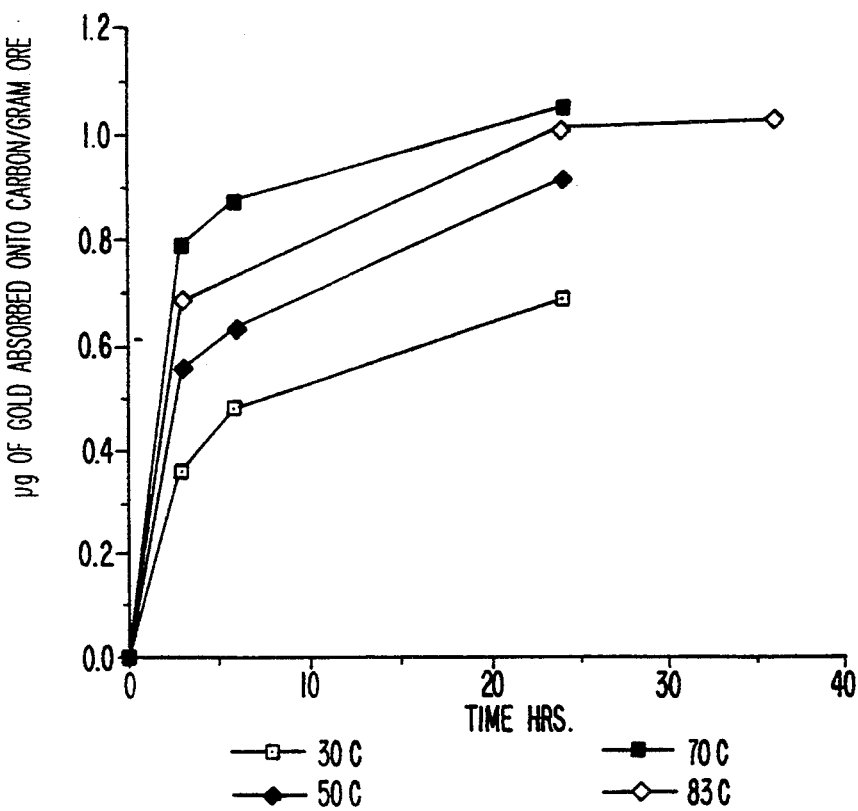
FIG. 13 is a graph illustrating the gold concentration adsorbed onto activated carbon during the hot CIL step of a process according to the present invention as a function of time for various hot CIL temperatures.

FIGS. 11–13 illustrate that the optimum temperature for the hot CIL extraction is approximately 70° C. In fact, FIGS. 12 and 13 show that less gold is actually extracted from the flotation tail at 83° C. than at 70° C. and that less gold is adsorbed by the activated carbon per unit weight at 83° C. than at 70° C.

EXAMPLE 14

Carbonaceous ore must be ground fine enough to free the native carbon from the gangue or matrix so that it can be subsequently separated by flotation. However, very fine grinding may not be needed for all ores. Ores that have low grades of gold value may not justify the cost of very fine grinding. The optimal grind time for a particular ore can be determined by a set of grinding experiments in which the ground ore is treated using the combined reverse leach-flotation and hot CIL process.

The low grade (3.5 ppm Au) carbonaceous ore used in Examples 11, 12 and 13 was ground in a solution containing Ca(OH)$_2$ and cyanide. The concentration of Ca(OH)$_2$ in the grind/leach solution was 2.5 g/l and the cyanide concentration was 1000 ppm. Meadowfoam oil was also added as a collector to the grinding solution in an amount of 0.5 ml/Kg of ore. The pulp density of the ground ore was approximately 67%. This procedure was carried out the same way for five different grinding times ranging from 5 minutes to 60 minutes.

After grinding, each sample was diluted to approximately a 20% pulp density with a solution containing Dowfroth 250 oil, 5% by weight Na$_2$SO$_4$, and 2.5 g/l Ca(OH)$_2$. The samples were then floated.

After flotation the entire tail was used for a hot CIL test. The ore was made into a pulp of less than 30%

Another embodiment of the present invention is now described.

The hot carbon in leach process according to the present invention is most effective on carbonaceous ore that has gone through a reverse leach-flotation step so that it has had substantially all of its preg-robbing carbonaceous material and the gold that it adsorbs after cyanide treatment removed during the flotation step. This is because an equilibrium distribution of gold between the added activated carbon and the indigenous carbonaceous material is reached more quickly during the hot CIL step as the amount of indigenous carbonaceous material in the flotation tail decreases. Thus, the more preg-robbing carbonaceous material that is removed the less preg-robbing carbonaceous material there is left behind in the ore to bind the gold when the final equilibrium is reached or approached. By the same rational the more gold that is adsorbed by the indigenous carbon during leaching in cyanide and before separation the less gold there will be left in the final hot CIL. This also helps

TABLE IV

|   | Gr. Time | μ pass 80% | est. mesh | % pass 200 | % Au by AA | % Au by FA | wt % conc. | Tail FA | Tail AA | % Au in car | % Au in conc. | % Au in tail |
|---|---|---|---|---|---|---|---|---|---|---|---|---|
| 1 | 5 | 115 | 135 | 63.2 | 87.5 | 82.2 | 11.3 | 0.72 | 0.475 | 35.1 | 52,400 | 12,500 |
| 2 | 10 | 64 | 225 | 86.6 | 92.2 | 86.7 | 12.9 | 0.52 | 0.290 | 33.6 | 58,600 | 7,840 |
| 3 | 20 | 40 | 360 | 98.9 | 94.3 | 87.5 | 17.1 | 0.51 | 0.220 | 27.4 | 66,900 | 5,660 |
| 4 | 40 | 28 | 480 | 99.3 | 94.9 | 90.2 | 19.5 | 0.42 | 0.210 | 23.4 | 71,450 | 5,130 |
| 5 | 60 | 21 | 700 | 98.9 | 94.8 | 90.4 | 21.5 | 0.40 | 0.210 | 19.6 | 75,170 | 5,240 |

LEGEND:
Gr. Time = Grind time (minutes).
μ pass 80% = Micron size that 80% of ore passes.
est. mesh = Estimated mesh size that 80% of ore will pass.
% pass 200 = % of the ore which passes 200 mesh
% Au by AA = % Au recovery by atomic absorption.
% Au by FA = % Au recovery by fire assay.
wt % conc. = weight % concentrate collected during flotation.
Tail FA = ppm Au in tail by fire assay.
Tail AA = ppm Au in tail by atomic absoprtion.
% Au in car = % Au in carbon after hot CIL
% Au in conc. = % Au in flotation concentrate
% Au in tail = % Au in hot CIL tail.

using a solution containing 500 ppm CN and 2.5 g Ca(OH)$_2$/l. The final pulp contained approximately 25 g/l of activated carbon, which was also added. After 16 hours at a temperature of 70° C., the activated carbon was removed using a 60 mesh sieve. The activated carbon was washed with cold water and then heated for at least 24 hours at 500° C. The gold value in the activated carbon was determined by acid digestion followed by AA analysis for gold.

The native carbon flotation concentrates were weighed after drying and then roasted at 450 to 500° C. for at least 48 hours. This oxidized both the native carbon and the sulfides in the ore concentrate. Furthermore, this process is believed to be similar to what a large scale process for recovering gold from the concentrate of this process would be like. The oxidized concentrate was then leached with cyanide for at least 16 hours, following which, the native carbon concentrate was analyzed for gold as described above.

Figure 14:
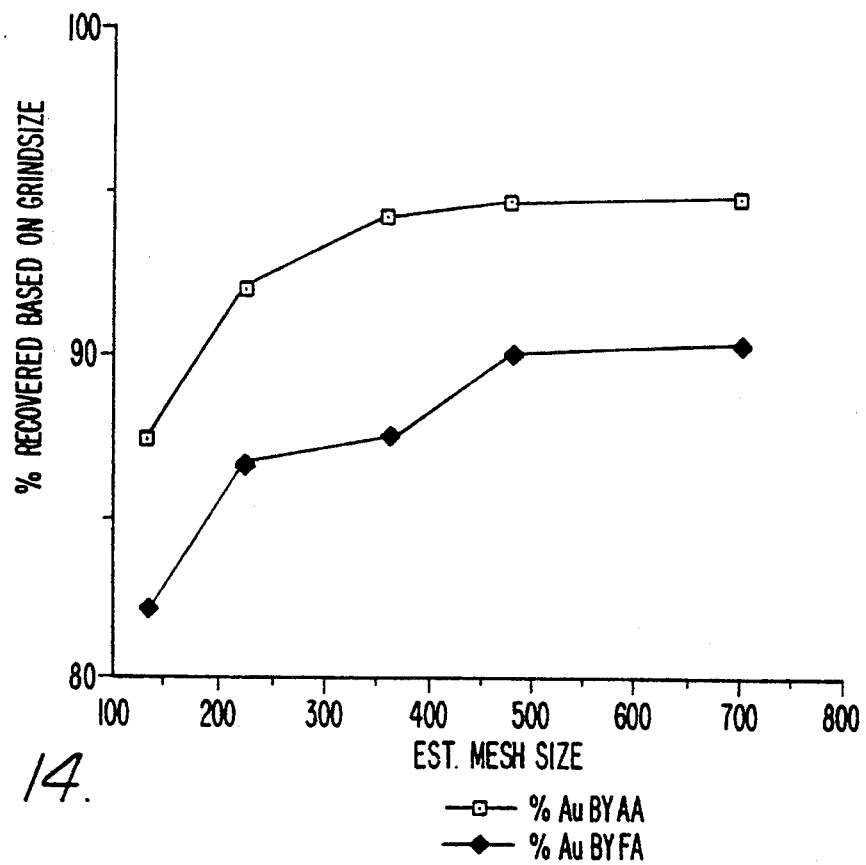
FIG. 14 is a graph illustrating the percent gold recovered as a function of grind size.

The percentage recovery of gold, as calculated using both a fire assay and a roasting assay of the tail, is plotted as a function of the estimated mesh size that would pass 80% of the ore in FIG. 14. In addition, the data resulting from the tests are presented in tabular form in Table IV below. The particle size information was obtained by dry sieve separations and weighing fractions using 100, 140, 200, 270, 400, 500 mesh sieves.

the efficiency of the final hot CIL by reducing the amount of activated carbon needed to achieve a sufficiently low value of gold, in the final tail, to make the process economically feasible.

Other gold ores, however, may not be as high in preg-robbing carbonaceous material, but still have carbonaceous material with a substantial amount of gold associated with it. This type of gold ore may release the gold from the carbon by an elevated temperature CIL treatment alone. The preferred method to treat such an ore is to first float off the gold containing carbon as a concentrate and then perform a hot CIL treatment on the tails. Alternatively, the ore may be treated by simply subjecting the ore to a hot CIL process without first separating the gold containing carbon.

The following Examples further illustrate the process according to the present embodiment of the invention.

EXAMPLE 15

Figure 16:
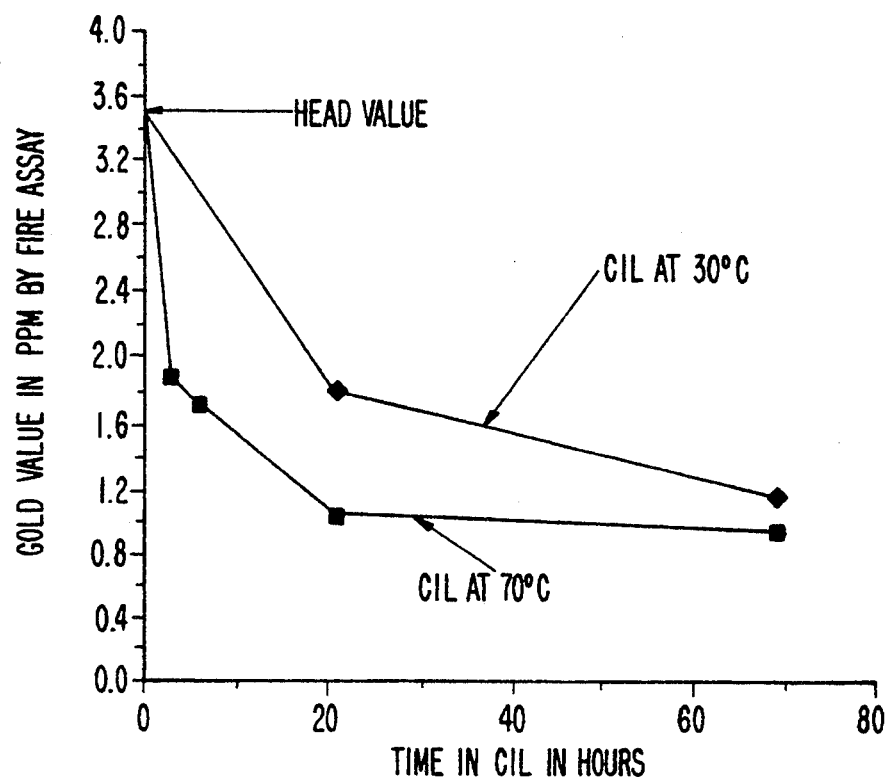
FIG. 16 is a graph illustrating the gold remaining in a non-floated highly preg-robbing ore as a function of time in hot CIL treatments at 30° C. and 70° C. according to another embodiment of the present invention.

A 500 g sample of the same low grade (3.5 ppm) Nevada gold ore used in Examples 11 to 14 was ground in a ball mill with 250 ml of water and no oil or cyanide. This sample was very preg-robbing and contained about 1% organic carbon and almost no graphitic carbon. The ground ore was made into a cake and cut into uniform 70 g wedges (wet weight), so that each would have a dry weight of about 50 g. Samples were repulped to a 30% pulp density with a solution containing 500 ppm CN and 2.5 g/l Ca(OH)$_2$. Activated carbon was added at a concentration of 25 g/l (2.5 g/100 ml sample). Samples were shaken at 200 rpm in 250 ml flasks heated to either 30° C. or 70° C. Samples heated to 70° C. were removed at 3, 6, 21 and 69 hours from the waterbath. The activated carbon was removed using a 60 mesh sieve. Both the carbon and the ore tail were analyzed for gold. Two samples were shaken at 30° C. One sample was sieved at 21 hours, the other at 69 hours. FIG. 16 shows the gold remaining in the ore as a function of time in the CIL for both the 30° C. and the 70° C. samples. This example shows that gold is removed much faster in the 70° C. CIL than the 30° C. CIL. However, at 69 hours both temperature experiments appear to be approaching the same equilibrium point. This equilibrium value of gold in the ore tail is much higher than those achieved by the combined reverse leach-flotation and hot CIL procedure used in Examples 11–14, however, it is lower than that achieved in traditional carbon in leach processes conducted at ambient temperature.

Although the invention has been described with reference to preferred embodiments and specific examples, it will readily be appreciated by those of ordinary skill in the art that many modifications and adaptions of the invention are possible without departure from the spirit and scope of the invention as claimed hereinafter. For example, while the processes according to the present invention have been described in terms of recovering gold from carbonaceous ores, the processes are equally applicable to other precious metals found in carbonaceous ores such as silver and platinum.

What is claimed:

1. A process for recovering a precious metal from carbonaceous ores comprising:
   a. leaching the carbonaceous ore with a lixiviant;
   b. preg-robbingly sorbing precious metal-lixiviant complexes from the lixiviant to the native carbonaceous component of said ore;
   c. separating the precious metal containing carbonaceous component from the ore to thereby form (1) a concentrate of the precious metal containing carbonaceous component and (2) a tail;
   d. recovering precious metal from the precious metal containing carbonaceous component concentrate;
   e. further treating the tail in a carbon in leach process, wherein the temperature of the leach solution of the carbon in leach process is between 30° C. and 83° C.;
   f. separating the activated carbon used in the carbon in leach process from the tail; and
   g. recovering gold from the activated carbon.

2. A process for recovering a precious metal from carbonaceous ore according to claim 1 wherein the method of separating the precious metal containing carbonaceous component from the ore is froth flotation.

3. A process for recovering a precious metal from carbonaceous ore according to claims 1 or 2 wherein the precious metal recovered from the carbonaceous ore is at least one member selected from the group consisting of gold, platinum and silver.

4. A process for recovering gold from carbonaceous gold ore according to claims 1 or 2 further comprising the step of augmenting the native carbonaceous component with finely ground carbon.

5. A process for recovering gold from carbonaceous gold ore according to claim 1 or 2 further comprising the step of augmenting the native carbonaceous component with recycled preg-robbing carbonaceous material.

6. A process for recovering gold from carbonaceous gold ore according to claim 1, wherein the temperature of the leach solution during said carbon in leach process is between 30° C. to 70° C.

7. A process for recovering gold from carbonaceous gold ore according to claim 1, wherein the temperature of the leach solution during said carbon in leach process is between 50° C. to 70° C.

8. A process for recovering gold from carbonaceous gold ore according to claim 1, wherein the temperature of the leach solution during said carbon in leach process is approximately 70° C.

9. A process for recovering gold from carbonaceous gold ores comprising:
   a. contacting ground carbonaceous gold ore, comprising a native carbonaceous component and a gangue material component, with a lixiviant solution to form a slurry and thereby cause the production of gold-lixiviant complexes and the dissolution of gold from the ore;
   b. preg-robbingly removing the gold-lixiviant complexes from solution to the native carbonaceous component of the ore;
   c. conditioning the slurry with a collector;
   d. adding a frother to the conditioned slurry;
   e. separating the gold containing carbonaceous component from the bulk of gangue material by froth flotation;
   f. recovering gold from the carbonaceous component; and
   g. further treating said gangue material in a carbon in leach process, wherein the temperature of the leach solution is between 30° C. and 83° C.;
   h. separating the activated carbon used in said carbon in leach process from the ore; and
   i. recovering gold from the activated carbon.

10. A process for recovering gold from carbonaceous gold ore according to claim 9, wherein the temperature of the leach solution during said carbon in leach process is between 30° C. to 70° C.

11. A process for recovering gold from carbonaceous gold ore according to claim 9, wherein the temperature of the leach solution during said carbon in leach process is between 50° C. to 70° C.

12. A process for recovering gold from carbonaceous gold ore according to claim 9, wherein the temperature of the leach solution during said carbon in leach process is approximately 70° C.

13. A process for recovering gold from carbonaceous gold ore according to claim 1 or 9, wherein the lixiviant used is cyanide.

14. A process for recovering precious metal from carbonaceous ore comprising:
   a. treating ground carbonaceous ore in a hot carbon in leach process, wherein the temperature of the leach solution for said carbon in leach process is maintained between 30° C. and 83° C.;
   b. separating the activated carbon used in said carbon in leach process from the ore; and
   c. recovering gold from the activated carbon.

15. A process for recovering gold from carbonaceous gold ore according to claim 14, wherein the temperature of the leach solution during said carbon in leach process is between 30° C. to 70° C.

16. A process for recovering gold from carbonaceous gold ore according to claim 14, wherein the temperature of the leach solution during said carbon in leach process is between 50° C. to 70° C.

17. A process for recovering gold from carbonaceous gold ore according to claim 14, wherein the temperature of the leach solution during said carbon in leach process is approximately 70° C.

* * * * *

UNITED STATES PATENT AND TRADEMARK OFFICE
CERTIFICATE OF CORRECTION

PATENT NO. : 5,364,453
DATED : NOVEMBER 15, 1994
INVENTOR(S) : WILLIAM C. KOHR

It is certified that error appears in the above-indentified patent and that said Letters Patent is hereby corrected as shown below:

Column 21, in TABLE IV, line 25, in % Au in conc. column, change "52,400" to -- 52.400 --.

Column 21, in TABLE IV, line 25, in "% Au in tail" column, change "12,500" to -- 12.500 --.

Column 21, TABLE IV, line 26, in "% Au in conc." column, change "58,600" to -- 58.600 --.

Column 21, TABLE IV, line 26, in "% Au in tail" column, change "7,840" to -- 7.840 --.

Column 21, TABLE IV, Line 27, in "% Au in conc." column, change "66,900" to -- 66.900 --.

Column 21, TABLE IV, line 27, in "% Au in tail" column, change "5,660" to -- 5.660 --.

Column 21, TABLE IV, line 28, in "% Au in conc." column, change "71,450" to -- 71.450 --.

Column 21, TABLE IV, line 28, in "% Au in tail" column, change "5,130" to -- 5.130 --.

Column 21, TABLE IV, line 29, in "% Au in conc." column, change "75,170" to -- 75.170 --.

Column 21, TABLE IV, line 29, in "% Au in tail" column, change "5,240" to -- 5.240 --.

UNITED STATES PATENT AND TRADEMARK OFFICE
CERTIFICATE OF CORRECTION

PATENT NO. : 5,364,453
DATED : November 15, 1994
INVENTOR(S) : William C. Kohr

It is certified that error appears in the above-indentified patent and that said Letters Patent is hereby corrected as shown below:

Column 21, TABLE IV, line 29, in "° Au in tail" column, change "5,240" to -- 5.240 --.

Signed and Sealed this

Ninth Day of May, 1995

Attest:

BRUCE LEHMAN

Attesting Officer     Commissioner of Patents and Trademarks